(12) United States Patent
Okamoto

(10) Patent No.: US 8,692,946 B2
(45) Date of Patent: Apr. 8, 2014

(54) DISPLAY APPARATUS

(75) Inventor: Yoshiki Okamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 189 days.

(21) Appl. No.: 13/218,659

(22) Filed: Aug. 26, 2011

(65) Prior Publication Data

US 2012/0057108 A1    Mar. 8, 2012

(30) Foreign Application Priority Data

Sep. 2, 2010  (JP) ................................ 2010-196818

(51) Int. Cl.
*G02F 1/1335*  (2006.01)

(52) U.S. Cl.
USPC ............................................. 349/15; 348/51

(58) Field of Classification Search
USPC ............................................. 349/15; 348/51
See application file for complete search history.

(56) References Cited

U.S. PATENT DOCUMENTS

| | | | |
|---|---|---|---|
| 2001/0028352 A1* | 10/2001 | Naegle et al. | ................. 345/501 |
| 2002/0018585 A1* | 2/2002 | Kim | ............................. 382/125 |
| 2005/0052529 A1 | 3/2005 | Mashitani et al. | |
| 2005/0280602 A1 | 12/2005 | Tzschoppe et al. | |
| 2005/0285997 A1* | 12/2005 | Koyama et al. | ................. 349/117 |
| 2008/0316604 A1* | 12/2008 | Redert et al. | ................... 359/614 |
| 2012/0056897 A1 | 3/2012 | Okamoto | |
| 2012/0057227 A1 | 3/2012 | Okamoto | |
| 2012/0057228 A1 | 3/2012 | Okamoto | |

FOREIGN PATENT DOCUMENTS

| | | |
|---|---|---|
| JP | 3955002 | 5/2007 |
| JP | 4023626 | 10/2007 |

\* cited by examiner

*Primary Examiner* — Michael Caley

(74) *Attorney, Agent, or Firm* — Wolf, Greenfield & Sacks, P.C.

(57) ABSTRACT

A display apparatus includes a display unit; a barrier unit including a plurality of transmissive sections; and a filter having a transmittance distribution in which transmittance of light passing through a central portion of the transmissive section of the barrier unit is lower than transmittance of light passing through a circumferential portion of the transmissive section of the barrier unit.

12 Claims, 16 Drawing Sheets

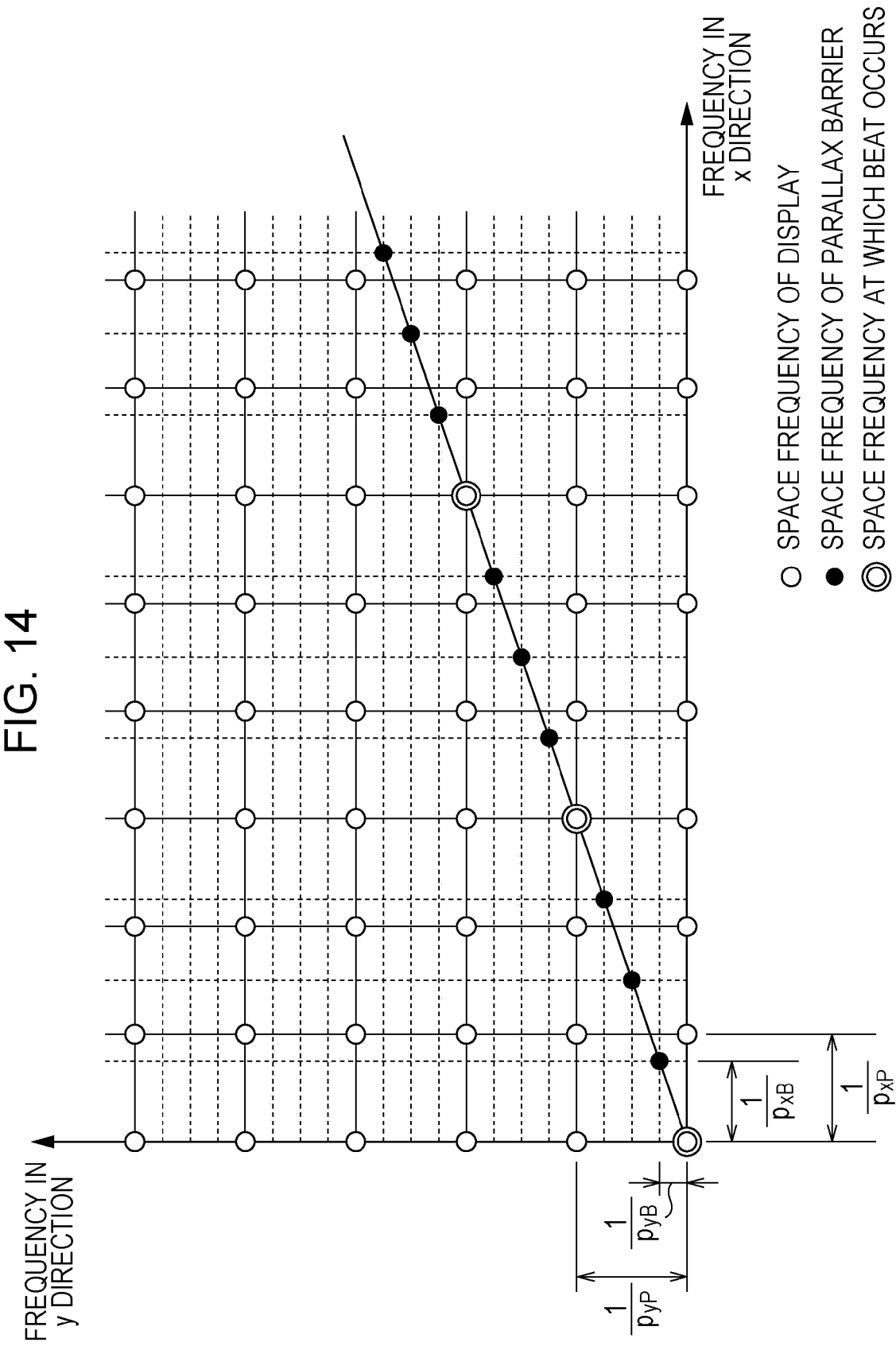

DISPLAY APPARATUS

BACKGROUND

The present disclosure relates to a display apparatus, and more particularly, to a display apparatus in which a barrier separates an image oriented toward a plurality of viewpoints.

A display apparatus has been developed in which a barrier including transmissive sections spatially separates an image oriented toward a plurality of viewpoints, so that images different in the respective viewpoints can be viewed. In such a display apparatus, the observer can view a stereoscopic image with his or her naked eyes by setting the plurality of viewpoints including the positions of the right and left eyes of the observer and reflecting a predetermined parallax between the image oriented toward the viewpoint at the position of the right eye and the image oriented toward the viewpoint at the position of the left eye. The barrier used in the display apparatus is particularly called a parallax barrier. Further, the display apparatus using the parallax barrier can also display a planar image, for example, by reflecting no parallax to the images oriented toward the plurality of viewpoints, that is, by displaying the same image at the plurality of viewpoints.

In the display apparatus in which the images oriented toward the plurality of viewpoints are periodically arranged to be displayed, luminance unevenness called moire is generated. The moire is observed as a striped pattern in an image and thus may give a sense of discomfort to an observer. For this reason, techniques for reducing the moire observed in an image have been devised. For example, Japanese Patent No. 4023626 discloses a technique for reducing the moire by allowing a proportion of the transmissive sections to be larger than a normal proportion in the barrier. Further, Japanese Patent No. 3955002 discloses a technique for reducing the moire by forming the transmissive sections of the barrier in an inclined stripe shape so that the width of the transmissive section is identical to a horizontal pixel pitch.

SUMMARY

In Japanese Patent No. 4023626, the proportion of the transmissive sections of the barrier is set to be 1.1 to 1.8 times the reciprocal of the number of viewpoints, but a process of deriving the proportion of the transmissive sections is not clarified. In Japanese Patent No. 3955002, the fact that the width of the transmissive section of the barrier is made to be identical to the horizontal pixel pitch is just described, but a process of deriving the width of the transmissive section is not described at all. The display apparatus has to be designed in consideration of various requirements as well as the reduction in the moire so as not to give a sense of discomfort or fatigue to an observer who views an image. Therefore, when attempts are made to reduce the moire by the above-mentioned techniques, a problem may arise in that flexibility in design of a display apparatus may deteriorate due to restriction on the configuration thereof.

It is desirable to provide a novel and improved display apparatus capable of reducing moire while ensuring flexibility in design in the configuration in which a barrier separates an image oriented toward a plurality of viewpoints.

According to an embodiment of the disclosure, there is provided a display apparatus including: a display unit; a barrier unit including a plurality of transmissive sections; and a filter having a transmittance distribution in which transmittance of light passing through a central portion of the transmissive section of the barrier unit is lower than transmittance of light passing through a circumferential portion of the transmissive section of the barrier unit.

With such a configuration, the filter is provided in the transmissive section of the barrier unit. Therefore, the filter is designed so as to have the transmittance distribution in which the transmittance of the light passing through the central portion of the transmissive section is lower than the transmittance of the light passing through the circumferential portion of the transmissive section. Accordingly, the filter can execute the control so that the amount of light that does not pass through the central portion of the transmissive section of the barrier unit is larger than the amount of light that does not pass through the circumferential portion of the transmissive section. Thus, by cutting the light with the low-order frequency component which passes through the central portion of the transmissive section of the barrier unit and is a cause of generation of the moire, it is possible to suppress the generation of the moire.

The display unit may display N viewpoint images on a display surface. The filter may be designed so as to eliminate light with a frequency component at least equal to or less than an N-order frequency component in the light passing through the transmissive section of the barrier unit in accordance with the transmittance distribution.

The filter may be designed so that in the transmittance distribution, the transmittance is lowered in a curved shape from the circumferential portion of the transmissive section of the barrier unit to the central portion of the transmissive section of the barrier unit.

The filter may be designed so that in the transmittance distribution, the transmittance is lowered in a step shape from the circumferential portion of the transmissive section of the barrier unit to the central portion of the transmissive section of the barrier unit.

According to another embodiment of the disclosure, there is provided a display apparatus including: a display unit; a barrier unit including a plurality of transmissive sections; and a filter having a transmittance distribution in which transmittance of light passing through a central portion of an opening section of the display unit is lower than transmittance of light passing through a circumferential portion of the opening section of the display unit.

According to still another embodiment of the disclosure, there is provided a display apparatus including: a display unit displaying an image in a self-luminescent manner; a barrier unit disposed on a side of a display surface of the display unit and separating an image displayed on the display unit; and a filter having a transmittance distribution in which luminescence intensity of light passing through a central portion of an opening section of the display unit is lower than luminescence intensity of light passing through a circumferential portion of the opening section of the display unit.

In the display unit, one pixel may be formed by three sub-pixels. The filter may be designed so as to eliminate light with a frequency component at least equal to or less than a three-order frequency component in the light passing through the opening section of the display unit in accordance with the transmittance distribution.

The filter may be designed so that in the transmittance distribution, the transmittance is lowered in a curved shape from the circumferential portion of the opening section of the display unit to the central portion of the opening section of the display unit.

The filter may be designed so that in the transmittance distribution, the transmittance is lowered in a step shape from the circumferential portion of the opening section of the display unit to the central portion of the opening section of the display unit.

In the display unit, sub-pixels may be periodically arranged at a first sub-pixel pitch in a first direction of a screen, each pixel may be formed by the plurality of sub-pixels, and a plurality of viewpoint images may be displayed on a display surface. The barrier unit may be disposed in front of the display surface of the display unit, and the transmissive sections having a first width in the first direction in the barrier unit may be periodically arranged so that the plurality of viewpoint images are separated. The first width may be set so as to be close to a multiple m (where m=1, 2, . . . , N (where N is the number of plurality of viewpoint images)) of the first sub-pixel pitch.

The first width may be a multiple m of the first sub-pixel pitch.

According to further still another embodiment of the disclosure, there is provided a display apparatus including: a display unit; and a barrier unit including a plurality of transmissive sections. The barrier unit has a transmittance distribution in which transmittance of light passing through a central portion of the transmissive section of the barrier unit is lower than transmittance of light passing through a circumferential portion of the transmissive section of the barrier unit.

The barrier unit may be configured by a liquid crystal panel.

According to further still another embodiment of the disclosure, there is provided a display apparatus including:
a display unit; and
a barrier unit including a plurality of transmissive sections.

Transmittance of light in a central portion of the transmissive section is lower than transmittance of light in a circumferential portion of the transmissive section.

According to the embodiments of the disclosure, it is possible to reduce the moire by controlling the amount of light emitted from the transmissive section of the barrier unit or the opening section of the display unit in the display apparatus in which the barrier unit separates the image oriented toward the plurality of viewpoints.

BRIEF DESCRIPTION OF THE DRAWINGS

FIG. 14 is a diagram illustrating a combination of the frequencies of the light intensities in first and second directions according to the second embodiment of the disclosure;

DETAILED DESCRIPTION OF EMBODIMENTS

Figure 1:
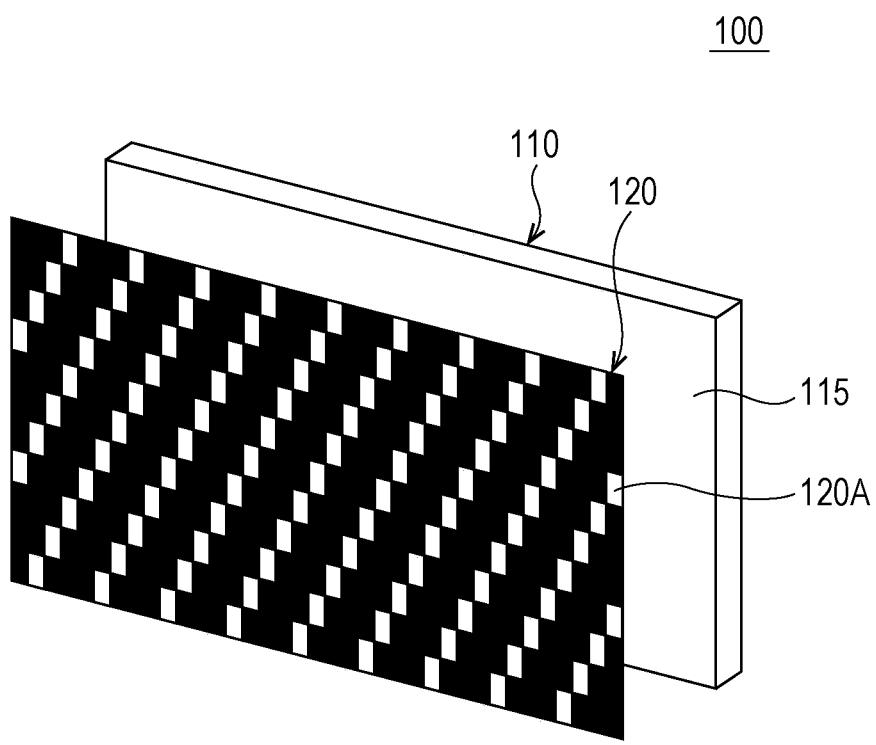
FIG. 1 is a diagram schematically illustrating the configuration of a display apparatus according to a first embodiment of the disclosure.

Hereinafter, preferred embodiments of the disclosure will be described in detail with reference to the accompanying drawings. Throughout the specification and the drawings, the same reference numerals are given to constituent elements having substantially the same function and the description thereof will not be repeated.

The description will be made in the following order.
1. First Embodiment
1-1. Configuration of Display Apparatus
1-2. Light Intensity Distribution in Image
1-3. Cause of Generation of Moire
1-4. Design for Reducing Moire
1-5. Filter
2. Second Embodiment
2-1. Configuration of Display Apparatus
2-2. Light Intensity Distribution in Image
2-3. Cause of Generation of Moire
2-4. Design for Reducing Moire
3. Embodiments of Filter 1. First Embodiment First, a first embodiment of the disclosure will be described with reference to FIGS. 1 to 10.
1-1. Configuration of Display Apparatus FIG. 1 is a diagram illustrating the overall configuration of a display apparatus 100 according to a first embodiment of the disclosure. As shown in FIG. 1, the display apparatus 100 includes a display 110 and a parallax barrier 120.

The display 110 is a display unit that displays N viewpoint images respectively oriented toward N viewpoints (where N is any plural number) using pixels having three sub-pixels. For example, the display 110 may be an LCD (Liquid Crystal Display), a PDP (Plasma Display Panel), an organic EL (Electro-Luminescence) panel, or the like.

The parallax barrier 120 is disposed in front of a display surface 115 of the display 110 or between a backlight of the display 110 and the display surface 115 at a predetermined interval. The parallax barrier 120 includes transmissive sections 120A formed in a step shape in an inclination direction. The parallax barrier 120 transmits light from the display 110 through the transmissive sections 120A and blocks the light in the other portions. The transmissive sections 120A are arranged so as to conform with the arrangement of the images oriented toward the N viewpoints displayed in the display 110, so that the parallax barrier 120 separates an image into the images oriented toward the N viewpoints for the viewpoint images, respectively.

Here, the parallax barrier 120 may be realized by displaying an image higher in the transmittance of light in portions corresponding to the transmissive sections 120A than in the other portions by the use of a transmissive liquid crystal display device. In this case, the transmissive sections 120A may not be necessarily physical opening sections. The transmittance of the light in the transmissive section 120A may not be necessarily 100% and may be higher than that the other portions.

Figure 2:
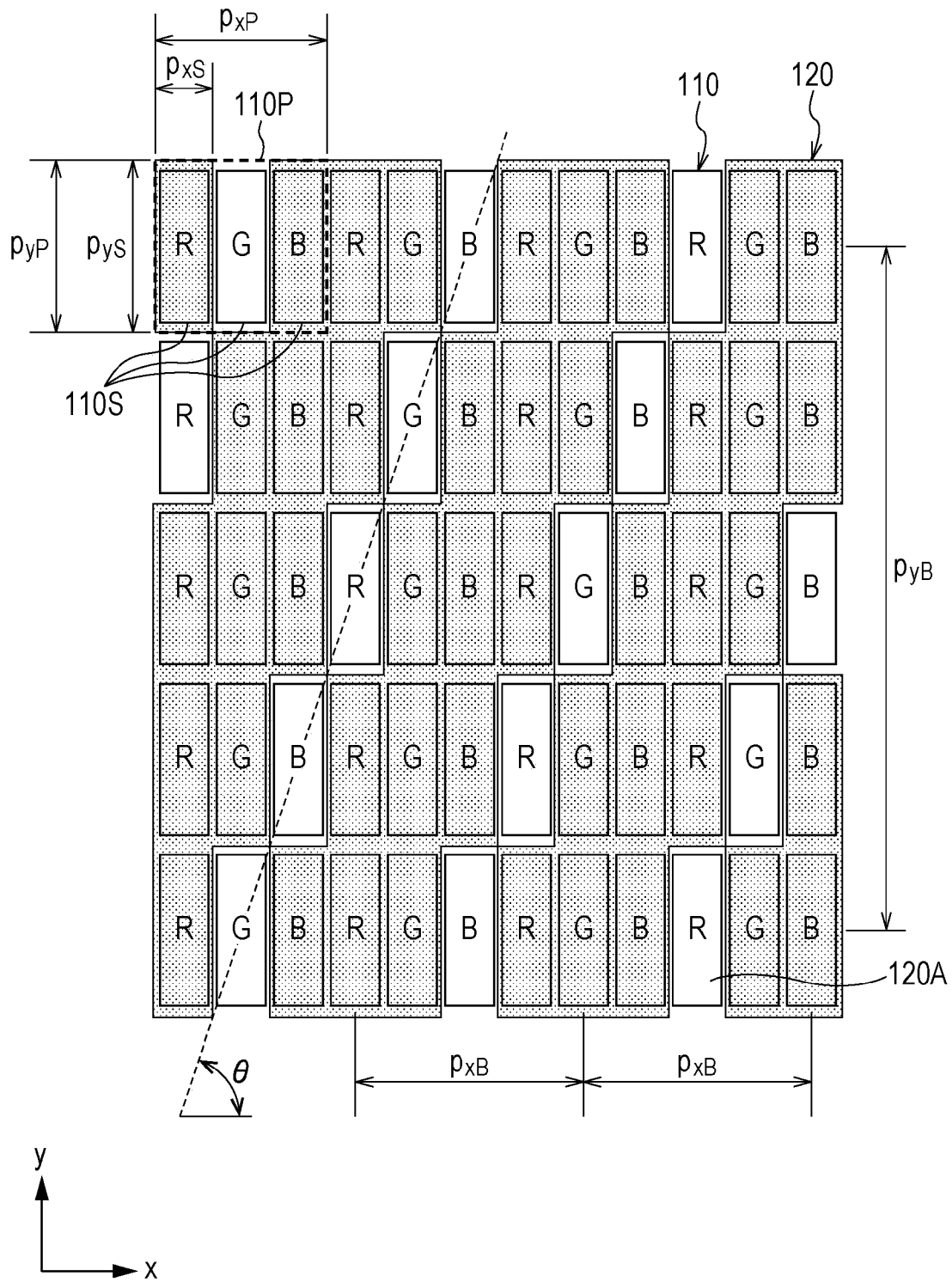
FIG. 2 is a schematic elevational view illustrating a display and a parallax barrier according to the first embodiment of the disclosure, when viewed from the side.

FIG. 2 is a schematic elevational view illustrating the display 110 and the parallax barrier 120 according to the first embodiment of the disclosure, when viewed from the side of the viewpoint. In the display 110, as shown in FIG. 2, sub-pixels 110S are periodically arranged. In this embodiment, a pixel 110P includes three sub-pixels 110S. The number of sub-pixels of the pixel may be plural and the embodiment of the disclosure is not limited to 3. In the parallax barrier 120, the transmissive sections 120A are periodically arranged. In this embodiment, the number of viewpoints N is 4.

The sub-pixels 110S are arranged in an x-axis direction, which is a first direction of a screen, at a first sub-pixel pitch $p_{xS}$ and are arranged in a y-axis direction, which is a second direction of the screen, at a second sub-pixel pitch $p_{yS}$. The sub-pixels 110S displaying three colors of R (red), G (green), and B (blue) are periodically arranged in the order of R, G, and B in the x-axis direction. The sub-pixels 110S displaying one of the three colors of R, G, and B are periodically arranged in the y-axis direction.

The pixel 110P includes three sub-pixels 110S displaying three colors of R, G, and B, respectively. The pixels 110P are arranged at a first pixel pitch $p_{xP}$ in the x-axis direction and are arranged at a second pixel pitch $p_{yP}$ in the y-axis direction. Here, since the pixel 110P includes the three sub-pixels 110S arranged in the x-axis direction, the first pixel pitch $p_{xP}$ and the first sub-pixel pitch $p_{xS}$ satisfy a relationship expressed by Expression (1).

$$p_{xS} = \frac{p_{xP}}{3} \tag{1}$$

Further, the second pixel pitch $p_{yP}$ and the second sub-pixel pitch $p_{yS}$ satisfy a relationship expressed by Expression (2).

$$p_{yS}=p_{yP} \tag{2}$$

The transmissive sections 120A are periodically arranged in the parallax barrier 120 and have a substantially similar shape to that of the sub-pixel 110S.

In the first embodiment, the parallax barrier 120 is a kind of barrier called a step barrier, in which the transmissive sections 120A with a step shape are arranged in the inclination direction of an angle θ. The transmissive sections 120A are arranged at a first barrier pitch $p_{xB}$ in the x-axis direction and are arranged at a second barrier pitch $p_{yB}$ in the y-axis direction.

Here, in the display 110, the image is separated oriented toward the N viewpoints and each image oriented toward a single viewpoint is displayed in the sub-pixel 110S arranged in the inclination direction of the angle θ. That is, the image oriented toward the first viewpoint, the image oriented toward the second viewpoint, . . . , and the image oriented toward the N-th viewpoint are repeatedly arranged in sequence in the unit of the sub-pixel 110S arranged in the inclination direction of the angle θ. Accordingly, the first barrier pitch $p_{xB}$, the first sub-pixel pitch $p_{xS}$, and the first pixel pitch $p_{xP}$ satisfy a relationship expressed by Expression (3).

$$p_{xB} = N \cdot p_{xS} = N \cdot \frac{p_{xP}}{3} \tag{3}$$

Further, the second barrier pitch $p_{yB}$, the second sub-pixel pitch $p_{yS}$, and the second pixel pitch $p_{yP}$ satisfy a relationship expressed by Expression (4).

$$p_{yB}=N \cdot p_{yS}=N \cdot p_{yP} \tag{4}$$

The angle θ is determined by a ratio between the x-axis direction and the y-axis direction of the sub-pixel 110S. For example, when the first pixel pitch $p_{xP}$ and the second pixel pitch $p_{yP}$ are the same as each other, a relationship expressed by Expression (5) is satisfied.

$$\theta=\arctan 3 \tag{5}$$

Figure 3:
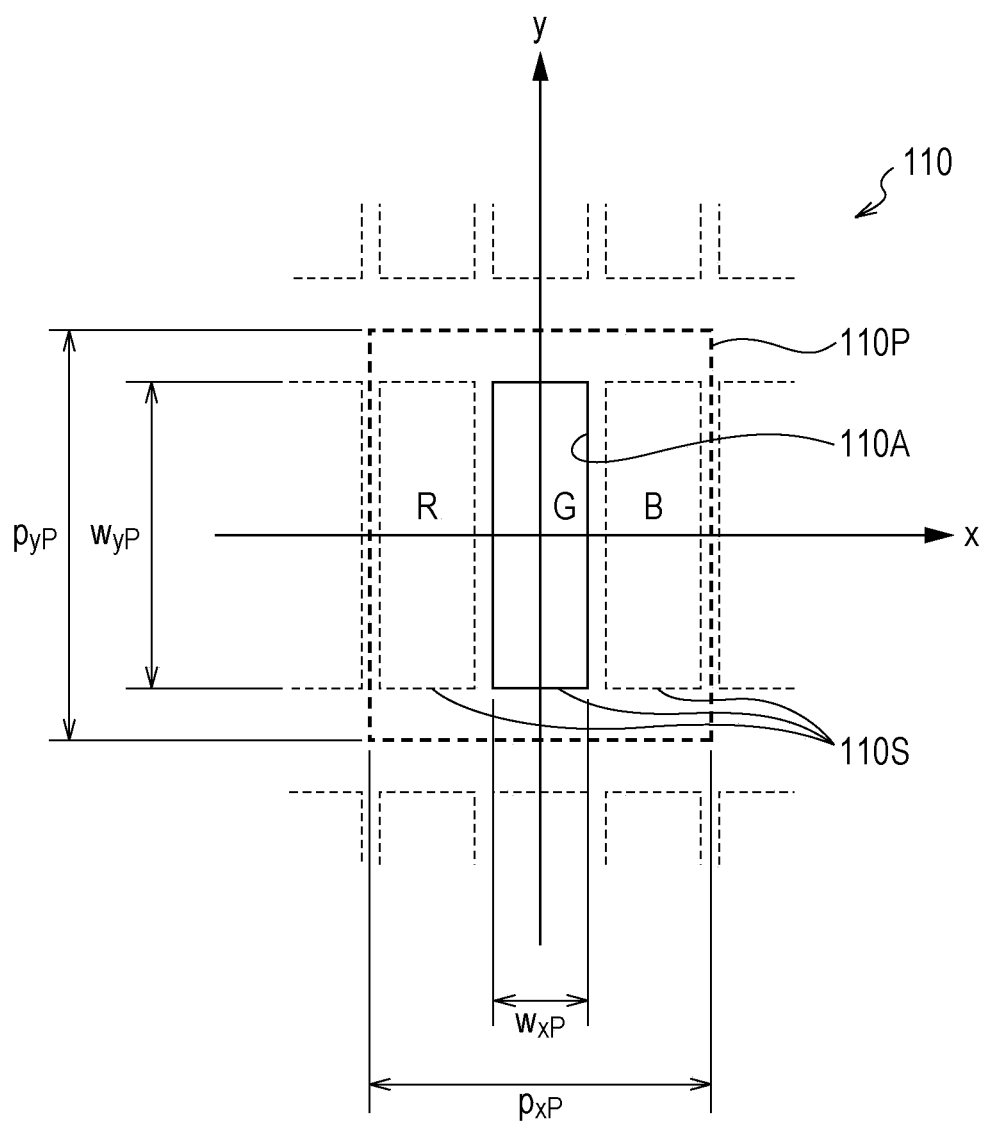
FIG. 3 is a diagram illustrating a pixel opening section according to the first embodiment of the disclosure.

1-2. Light Intensity Distribution in Image Light Intensity Distribution of Display FIG. 3 is a diagram illustrating a pixel opening section 110A according to the first embodiment of the disclosure. As shown in FIG. 3, the pixel opening section 110A is an opening section of one of the plurality of sub-pixels 110S that form the pixel 110P.

The pixel opening section 110A is a light-transmitting section of the pixel 110P for one of the three colors of R, G, and B. In the example shown in the drawing, G (green) light-transmitting section of the pixel 110P is set as the pixel opening section 110A. In this case, the pixel opening section 110A serves as an opening section of the sub-pixel 110S that displays G (green) light. The pixel opening section 110A has a first pixel opening width $w_{xP}$ in the x-axis direction and a second pixel opening width $w_{yP}$ in the y-axis direction.

Likewise, the same pixel opening section 110A exists in the pixel 110P (not shown) adjacent to the pixel 110P shown in the drawing. Accordingly, in the display 110, the interval of the pixel opening sections 110A in the x-axis direction is the same as the first pixel pitch $p_{xP}$ and the interval of the pixel opening sections 110A in the y-axis direction is the same as the second pixel pitch $p_{yP}$.

Figure 4:
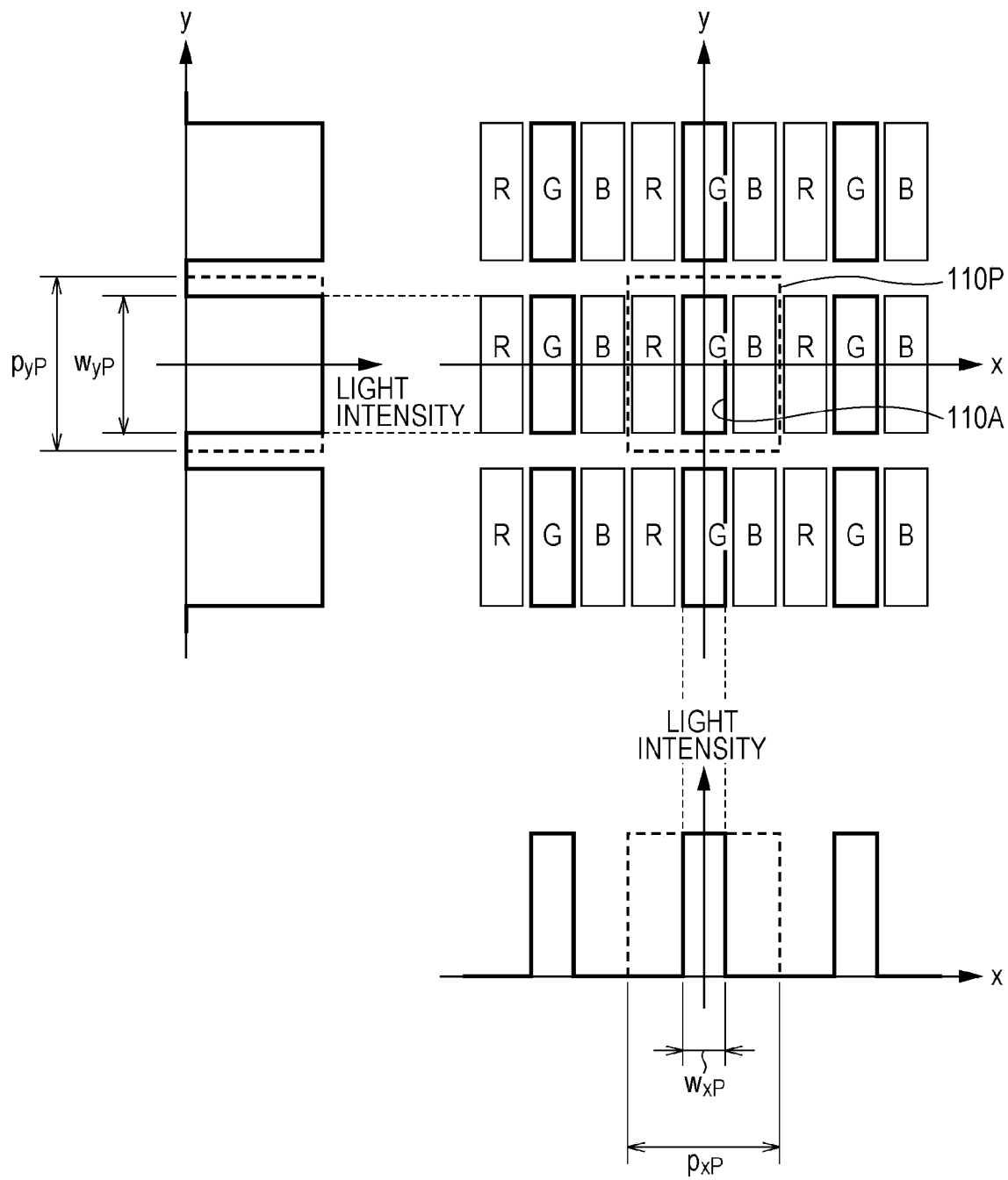
FIG. 4 is a diagram illustrating a light intensity distribution of the display according to the first embodiment of the disclosure.

FIG. 4 is a diagram illustrating a light intensity distribution of the display 110 according to the first embodiment of the disclosure. As shown in FIG. 4, the G (green) light intensity in the display 110 is distributed periodically in the x-axis and y-axis directions.

The display 110 emits the G (green) light in the pixel opening sections 110A which are the G (green) light-transmitting sections of the pixels 110P. As shown in the drawing, the pixels 110P are arranged at the first pixel pitch $p_{xP}$ in the x-axis direction and are arranged at the second pixel pitch $p_{yP}$ in the y-axis direction. In each pixel 110P, the pixel opening section 110A has a first pixel opening width $w_{xP}$ in the x-axis direction and has a second pixel opening width $w_{yP}$ in the y-axis direction.

Accordingly, the light intensity distribution of the display 110 has a pulse-shaped periodic structure with a period $p_{xP}$ and a width $w_{xP}$ in the x-axis direction. Further, the light intensity distribution has a pulse-shaped periodic structure with a period $p_{yP}$ and a width $w_{yP}$ in the y-axis direction. The light intensity observed with the two-dimensional periodic structure is expressed as a function $f_P(x,y)$ for the x and y coordinates using the Fourier series by Expression (6). In this expression, m and n denote the series order and $a_{mn}$, $a_m$, and $a_n$ denote Fourier coefficients.

$$f_P(x, y) = \sum_{m=-\infty}^{\infty} \sum_{n=-\infty}^{\infty} a_{mn} \cdot \exp\left[-i2\pi\left(\frac{m}{p_{xP}}x + \frac{n}{p_{yP}}y\right)\right] \qquad (6)$$

$$= \sum_{m=-\infty}^{\infty} a_m \cdot \exp\left[-i2\pi\frac{m}{p_{xP}}x\right] \cdot \sum_{n=-\infty}^{\infty} a_n \cdot \exp\left[-i2\pi\frac{n}{p_{yP}}y\right]$$

Light Intensity Distribution by Parallax Barrier

Figure 5:
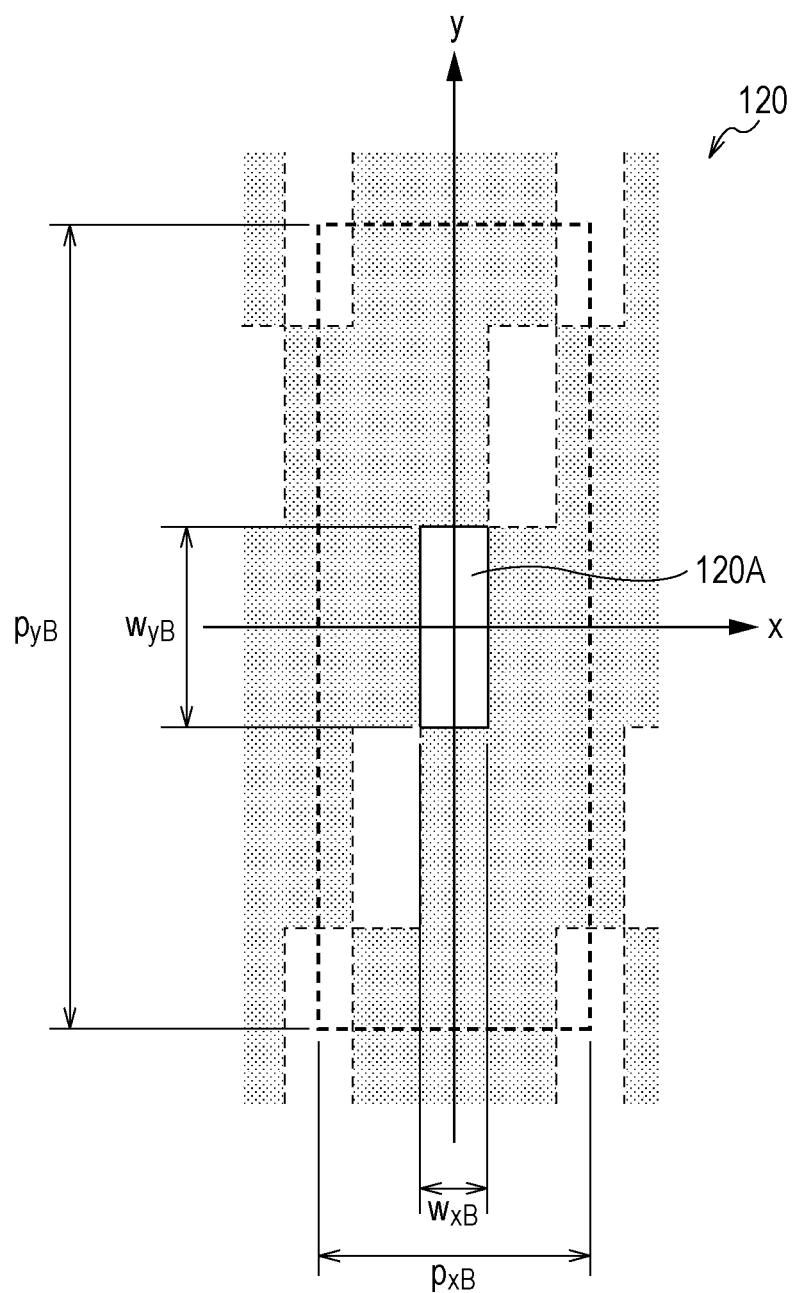
FIG. 5 is a diagram illustrating a transmission section according to the first embodiment of the disclosure.

FIG. 5 is a diagram illustrating the transmissive section 120A according to the first embodiment of the disclosure. As shown in FIG. 5, the transmissive sections 120A are periodically arranged in the parallax barrier 120.

The transmissive section 120A has a first width $w_{xB}$ in the x-axis direction and has a second width $w_{yB}$ in the y-axis direction. As shown in FIG. 2, the transmissive sections 120A are arranged at the first barrier pitch $p_{xB}$ in the x-direction and are arranged at the second barrier pitch $p_{yB}$ in the y-axis direction.

Figure 6:
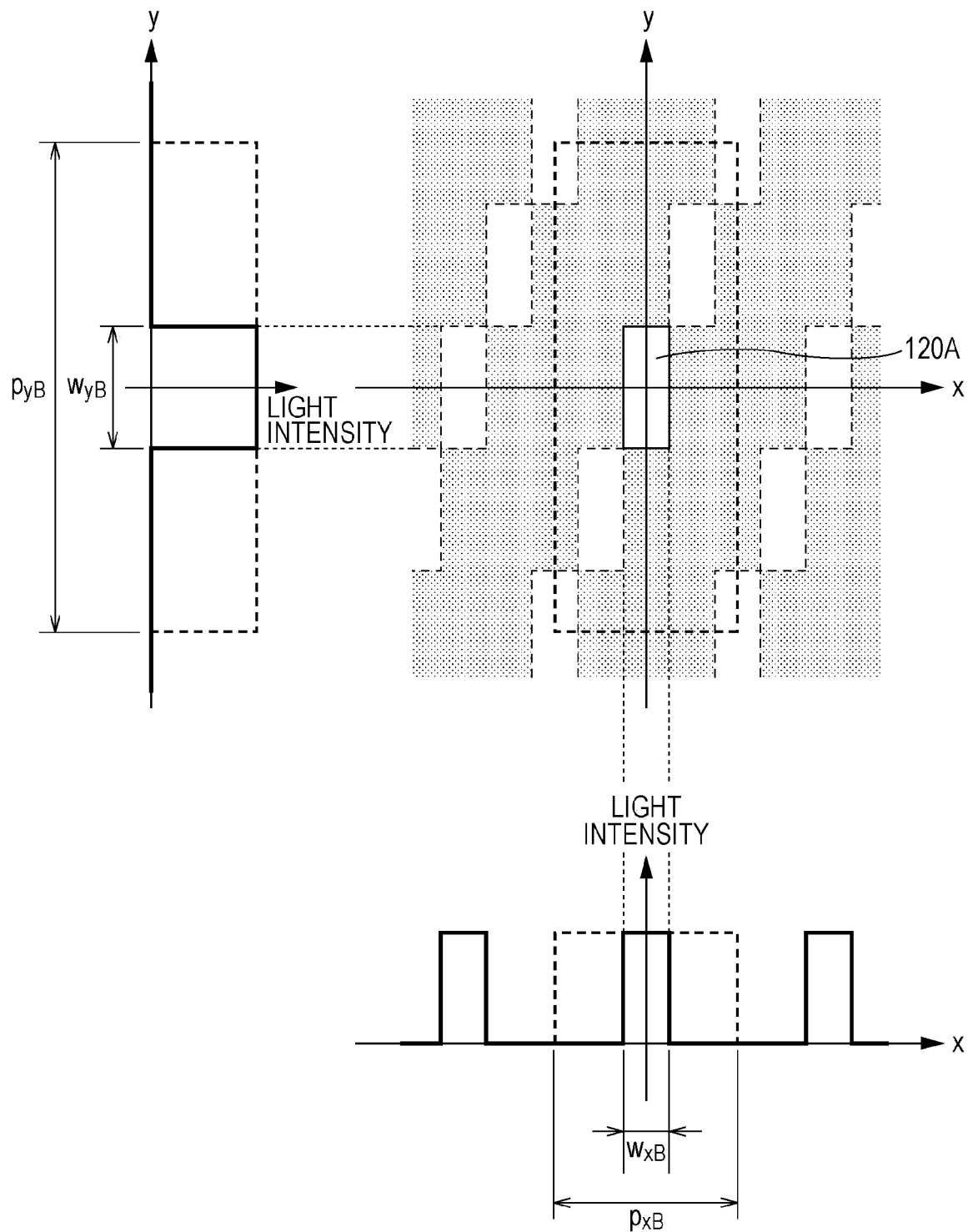
FIG. 6 is a diagram illustrating a light intensity distribution of a parallax barrier according to the first embodiment of the disclosure.

FIG. 6 is a diagram illustrating the light intensity distribution of a parallax barrier 120 according to the first embodiment of the disclosure. As shown in FIG. 6, the light intensity in the parallax barrier 120 is distributed periodically in the x-axis and y-axis directions.

In the parallax barrier 120, the transmissive sections 120A pass through the light from the display 110. As shown in the drawing, the transmissive sections 120A are arranged at the first barrier pitch $p_{xB}$ in the x-axis direction and are arranged at the second barrier pitch $p_{yB}$ in the y-axis direction. Further, the transmissive section 120A has a first width $w_{xB}$ in the x-axis direction and has a second width $w_{yB}$ in the y-axis direction.

Accordingly, the light intensity distribution of the parallax barrier 120 has a pulse-shaped periodic structure with a period $p_{xB}$ and a width $w_{xB}$ in the x-axis direction. Further, the light intensity distribution has a pulse-shaped periodic structure with a period $p_{yB}$ and a width $w_{yB}$ in the y-axis direction. The light intensity observed with the two-dimensional periodic structure is expressed as a function $f_B(x,y)$ for the x and y coordinates using the Fourier series by Expression (7). In this expression, m and n denote the series order and $b_{mn}$, $b_m$, and $b_n$ denote Fourier coefficients.

$$f_B(x, y) = \sum_{m=-\infty}^{\infty} \sum_{n=-\infty}^{\infty} b_{mn} \cdot \exp\left[-i2\pi\left(\frac{m}{p_{xB}}x + \frac{n}{p_{yB}}y\right)\right] \qquad (7)$$

$$= \sum_{m=-\infty}^{\infty} b_m \cdot \exp\left[-i2\pi\frac{m}{p_{xB}}x\right] \cdot \sum_{n=-\infty}^{\infty} b_n \cdot \exp\left[-i2\pi\frac{n}{p_{yB}}y\right]$$

Light Intensity Distribution Observed in Image

The light intensity observed in an image displayed by the display apparatus 100 according to the first embodiment of the disclosure is a light intensity that is formed by superimposing the light intensity in the display 110 on the light intensity in the parallax barrier 120, as described above. The light intensity formed by the superimposing is expressed by a product of the functions representing the respective light intensities. Accordingly, the light intensity distribution observed in the image is expressed by a product of the function $f_P(x,y)$ of Expression (6) representing the light intensity in the display 110 and the function $f_B(x,y)$ of Expression (7) representing the light intensity in the parallax barrier 120, as in Expression (8).

$$f_P(x, y) \cdot f_B(x, y) = \sum_{m=-\infty}^{\infty} \sum_{n=-\infty}^{\infty} a_{mn} \cdot \exp\left[-i2\pi\left(\frac{m}{p_{xP}}x + \frac{n}{p_{yP}}y\right)\right] \cdot \qquad (8)$$

$$\sum_{m=-\infty}^{\infty} \sum_{n=-\infty}^{\infty} b_{mn} \cdot \exp\left[-i2\pi\left(\frac{m}{p_{xB}}x + \frac{n}{p_{yB}}y\right)\right] =$$

$$\sum_{m=-\infty}^{\infty} a_m \cdot \exp\left[-i2\pi\frac{m}{p_{xP}}x\right] \cdot \sum_{n=-\infty}^{\infty} a_n \cdot \exp\left[-i2\pi\frac{n}{p_{yP}}y\right] \cdot$$

$$\sum_{m=-\infty}^{\infty} b_m \cdot \exp\left[-i2\pi\frac{m}{p_{xB}}x\right] \cdot \sum_{n=-\infty}^{\infty} b_n \cdot \exp\left[-i2p\frac{n}{p_{yB}}y\right]$$

Figure 7:
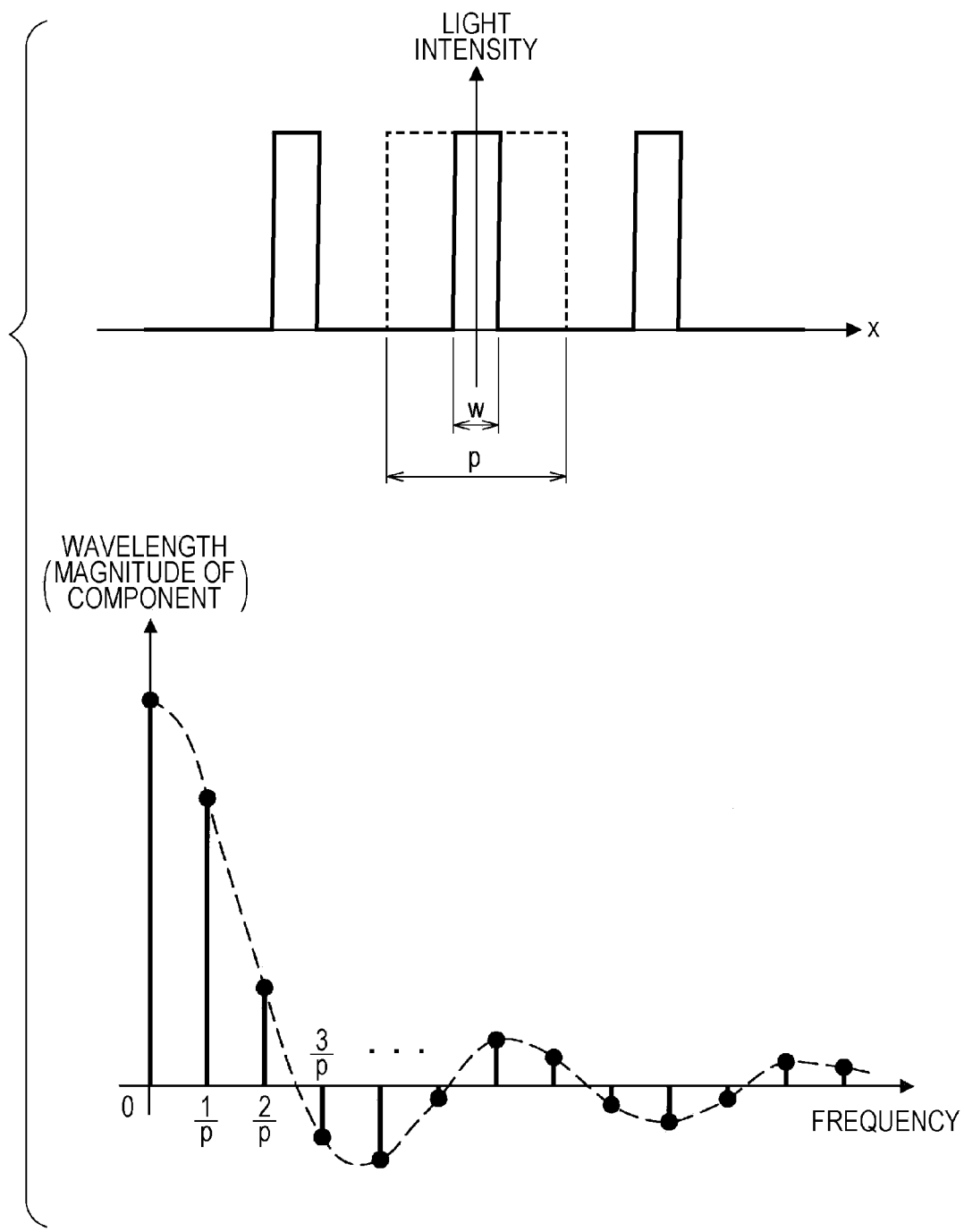
FIG. 7 is a diagram illustrating a frequency spectrum of the light intensity distribution according to the first embodiment of the disclosure.

FIG. 7 is a diagram illustrating a frequency spectrum of the light intensity distribution according to the first embodiment of the disclosure. As shown in FIG. 7, the light intensity having a pulse-shaped periodic structure with a period p and a width w has a discrete spectrum with an interval of 1/p.

The envelope line of the discrete spectrum of a function having a pulse-shaped periodic structure becomes a sinc function. When the envelope line of the discrete spectrum is applied to the function $f_P(x,y)$ of Expression (6) representing the light intensity of the display 110, a Fourier coefficient of the product form of the sinc function is calculated as in Expression (9).

$$a_{mn} = a_m \cdot a_n = \frac{\sin\left(\frac{w_{xP}}{p_{xP}}m\pi\right)}{m\pi} \frac{\sin\left(\frac{w_{yP}}{p_{yP}}n\pi\right)}{n\pi} \qquad (9)$$

Likewise, when the envelope line is applied to the function $f_B(x,y)$ of Expression (7) representing the light intensity in the parallax barrier 120, a Fourier coefficient in which a coefficient is applied to the sinc function is calculated, as in Expression (10), when j is any integer.

$$b_{mn} = \frac{\sin\left(\frac{w_{xB}}{p_{xB}}m\pi\right)}{m\pi} \qquad (10)$$

$$\frac{\sin\left(\frac{w_{yB}}{p_{yB}}n\pi\right)}{n\pi} \cdot \sum_{j=1}^{\frac{N}{2}} 2\cos\left[\frac{2j-1}{N}(m+n)\pi\right] \text{ EVEN NUMBER}$$

$$b_{mn} = \frac{\sin\left(\frac{w_{xB}}{p_{xB}}m\pi\right)}{m\pi} \frac{\sin\left(\frac{w_{yB}}{p_{yB}}n\pi\right)}{n\pi} \cdot \left\{1 + \sum_{j=1}^{\frac{N-1}{2}} 2\cos\left[\frac{2j}{N}(m+n)\pi\right]\right\}$$

ODD NUMBER.

Expression (10) is established, when $w_{xB} \leq p_{yB}/N$ and $w_{yB} \leq p_{yB}/N$. In other cases, the product portion of the sinc function is the same even when the coefficient portion is varied.

1-3. Cause of Generation of Moire

Figure 8:
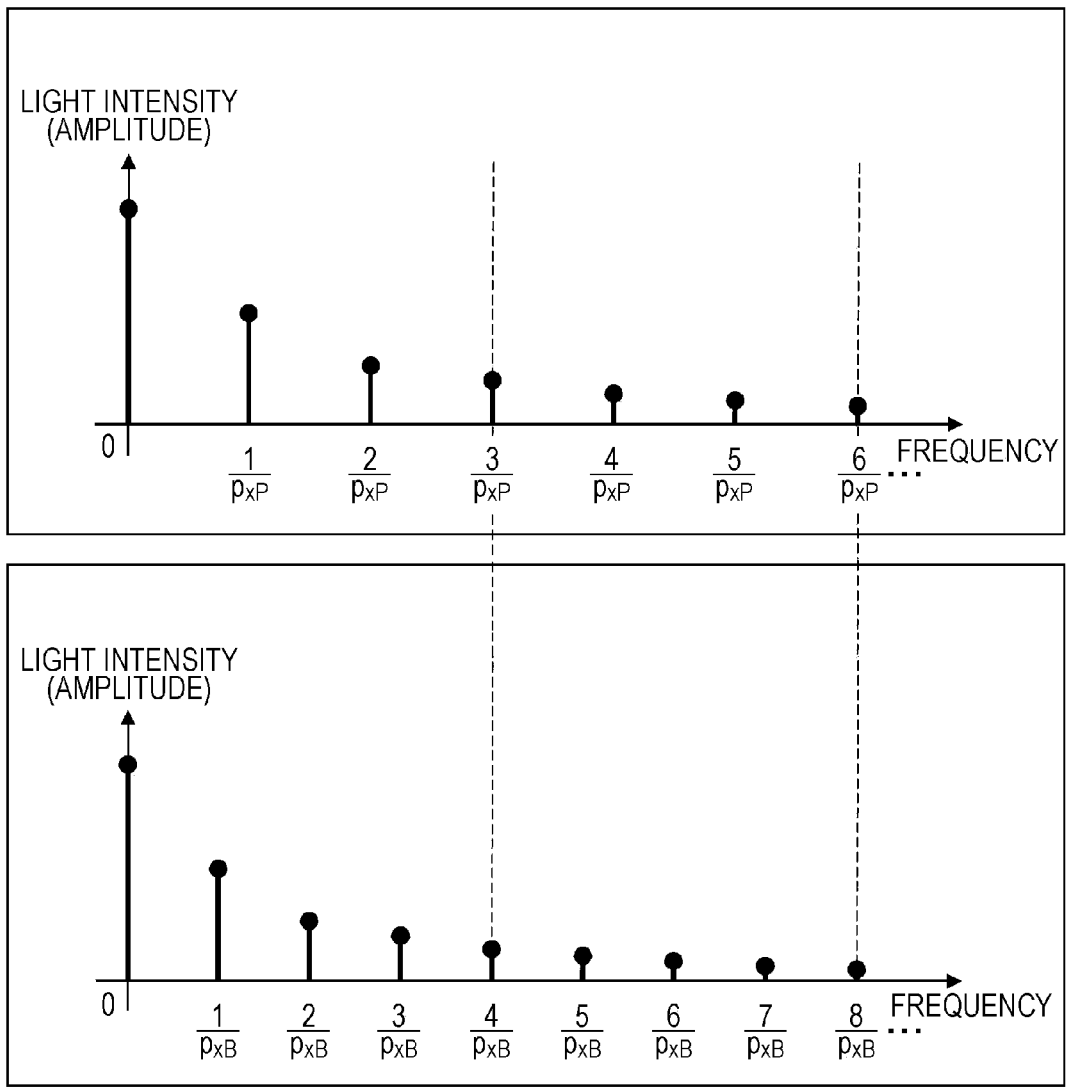
FIG. 8 is a diagram illustrating superposition between frequency spectra of the light intensity distributions according to the first embodiment of the disclosure.

FIG. 8 is a diagram illustrating the superposition between the frequency spectra of the light intensity distributions according to the first embodiment of the disclosure. The frequency spectrum of the light intensity distribution of the display 110 is shown in the x axis direction in the upper part of FIG. 8. The frequency spectrum of the light intensity distribution of the parallax barrier 120 is shown in the x axis direction in the lower part of FIG. 8.

As described above, the light intensity distribution having the pulse-shaped periodic structure has a discrete spectrum with the reciprocal of a periodic interval. The light intensity distribution of the display 110 shown in the upper side of the drawing has a discrete spectrum of an interval of $1/p_{xP}$. Likewise, the light intensity distribution of the parallax barrier 120 shown in the lower side of the drawing has a discrete spectrum of an interval of $1/p_{xB}$.

Here, a cause of generation of moire will be described. The moire is generated as luminance unevenness caused by beat (buzz) between frequency components when frequency components slightly different from each other in frequency are contained in the frequency component of each of the superimposed light intensity distributions when the plurality of light intensity distributions are superimposed on each other. The magnitude of the luminance unevenness depends on a product of the amplitudes (magnitude of light intensity) of the respective frequency components in which the beat occurs.

Accordingly, when the amplitude (light intensity) of the frequency component in which the beat occurs is large, the large luminance unevenness is generated, thereby observing the strong moire. Since the actual values of the first pixel pitch $p_{xP}$ and the first barrier pitch $p_{xB}$ depend on the mechanical processing accuracy and may have a small error, there is a high possibility of the moire being generated in the frequency component commonly contained in the respective light intensity distributions calculated by a value in terms of a design.

A condition for the frequency component commonly contained in the respective light intensity distributions of the display 110 and the parallax barrier 120 in the x-axis direction is expressed by Expression (11), when Expression (3) is used.

$$\frac{N}{p_{xB}} = \frac{3}{p_{xP}} \quad (11)$$

In this embodiment, since the number of viewpoints N is 4, a relationship of "$4/p_{xB}=3/p_{xP}$" is satisfied. Accordingly, in the example shown in FIG. 8, the components satisfying the above condition include the component with the frequency of $3/p_{xP}$ in the frequency component of the display 110, the component with the frequency of $4/p_{xB}$ in the frequency component of the parallax barrier 120, the component with the frequency of $6/p_{xP}$ in the frequency component of the display 110, and the component with the frequency of $8/p_{xB}$ in the frequency component of the parallax barrier 120.

The case in which the x-axis direction is used has hitherto been described, but the same relationship is applied to the y-axis direction, which is the second direction. A condition for the frequency component commonly contained in the respective light intensity distributions of the display 110 and the parallax barrier 120 in the y-axis direction is expressed by Expression (12), when Expression (4) is used.

$$\frac{N}{p_{yB}} = \frac{1}{p_{yP}} \quad (12)$$

A condition that the moire is generated in the observed image is expressed by Expression (13) from Expression (11) and Expression (12), when s and t are any integers.

$$\left(s\frac{N}{p_{xB}}, t\frac{N}{p_{yB}}\right) = \left(s\frac{3}{p_{xP}}, t\frac{1}{p_{yP}}\right) \quad (13)$$

In this embodiment, N is 4 in Expression (12) and Expression (13), as described above.

Figure 9:
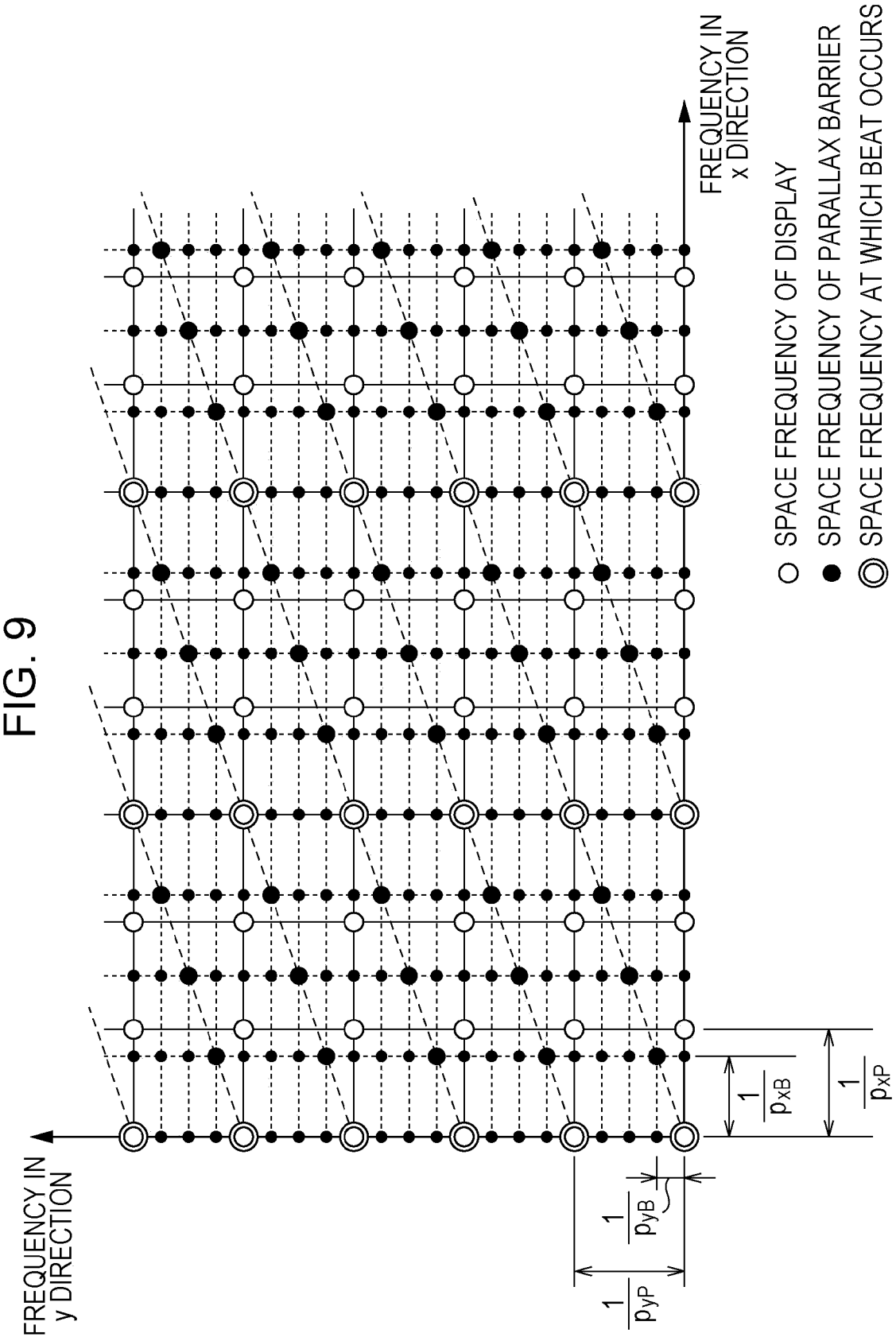
FIG. 9 is a diagram illustrating a combination of the frequencies of the light intensities in first and second directions according to the first embodiment of the disclosure.

FIG. 9 is a diagram illustrating a combination of the frequencies of the light intensities in the x-axis direction, which is the first direction, and y-axis direction, which is the second direction, according to the first embodiment of the disclosure. As shown in FIG. 9, the combination of the space frequencies of the light intensity distribution of the display 110 and the light intensity distribution of the parallax barrier 120 in the x-axis and y-axis directions is plotted.

The frequency distribution shown, here is a frequency distribution formed by combining the frequency distributions described with reference to FIG. 8 in the x-axis and y-axis directions. Accordingly, the combination of the frequency components commonly contained in the light intensity distribution of the display 110 and the light intensity distribution of the parallax barrier 120 in the x-axis and y-axis directions is shown as a combination of the frequency components in which the beat occurs. Here, the frequency at which the beat (moire) occurs appears at an equal interval in the xy space due to the periodicity of the light intensity distribution of the display 110 and the periodicity of the light intensity distribution of the parallax barrier 120.

1-4. Design for Reducing Moire

As expressed in Expression (8), the light intensity observed in the image is expressed by the product of the light intensity of the display 110 and the light intensity of the parallax barrier 120. Accordingly, when one of the light intensities approaches 0 in the combination of the frequency components at which the moire is generated, it is possible to reduce the moire.

First, when the Fourier coefficient expressed by Expression (9) becomes 0 in the light intensity distribution of the display 110, the light intensity (amplitude) of the frequency at which the moire is generated can be made to approach 0, thereby preventing the moire from being generated. The condition that the Fourier coefficient becomes 0 is expressed by Expression (14), when j is any integer.

$$\frac{\sin\left(\frac{w_{xP}}{p_{xP}}3j\pi\right)}{3j\pi} = 0 \text{ OR } \frac{\sin\left(\frac{w_{yP}}{p_{yP}}j\pi\right)}{j\pi} = 0 \quad (14)$$

The above condition is expressed by Expression (15) from Expression (1) and Expression (2). In this condition, since the first pixel opening width $w_{xP}$ is not greater than the first sub-pixel pitch $p_{xS}$ and the second pixel opening width $w_{yP}$ is not greater than the second sub-pixel pitch $p_{yS}$, the condition of Expression (14) is restricted to a case where j=1.

$$w_{xP}=p_{xS} \text{ OR } w_{yP}=q_{yS} \quad (15)$$

Furthermore, the condition that the Fourier coefficient expressed by Expression (10) becomes 0 in the light intensity distribution of the parallax barrier 120 is expressed by Expression (16), when j is any integer.

$$\frac{\sin\left(\frac{w_{xB}}{p_{xB}} jN\pi\right)}{jN\pi} = 0 \text{ OR } \frac{\sin\left(\frac{w_{yB}}{p_{yB}} jN\pi\right)}{jN\pi} = 0 \quad (16)$$

The above condition is expressed by Expression (17) from Expression (3) and Expression (4). In this condition, since the first width $w_{xB}$ is not greater than the first barrier pitch $p_{xB}$ and the second width $w_{yB}$ is not greater than the second barrier pitch $p_{yB}$, j is 1, 2, ..., N. That is, j is a natural number equal to or less than the number of viewpoints N.

$$\frac{w_{xB}}{p_{xS}} = j \text{ OR } \frac{w_{yB}}{p_{yS}} = j \quad (17)$$

When the conditions expressed by Expression (15) for the display 110 and Expression (17) for the parallax barrier 120 are summarized, one of the following conditions may be satisfied in order to reduce the moire observed in the image displayed by the display apparatus 100.

(a) A ratio of the first width $w_{xB}$ to the first sub-pixel pitch $p_{xS}$ is a natural number equal to or less than N.

(b) A ratio of the second width $w_{yB}$ to the second sub-pixel pitch $p_{yS}$ is a natural number equal to or less than N.

(c) The first pixel opening width $w_{xP}$ is identical to the first sub-pixel pitch $p_{xS}$.

(d) The second pixel opening width $w_{yP}$ is identical to the second sub-pixel pitch $p_{yS}$.

In the actual design of the display apparatus 100, it is difficult to precisely satisfy the above-mentioned conditions since there is a necessity to form a space for a driving circuit between the sub-pixels 110S. However, by designing the display apparatus so as to approximate the above-mentioned conditions, the moire can be reduced to some extent. In this case, by designing the display apparatus so as to satisfy a number of the conditions (a) to (d), the product of four Fourier coefficients shown in Expression (8) has a smaller value, thereby further reducing the moire.

1-5. Filter

In this embodiment, a film can be attached to at least one of the transmissive section 120A of the parallax barrier 120 and the pixel opening section 110A of the display 110.

Figure 10:
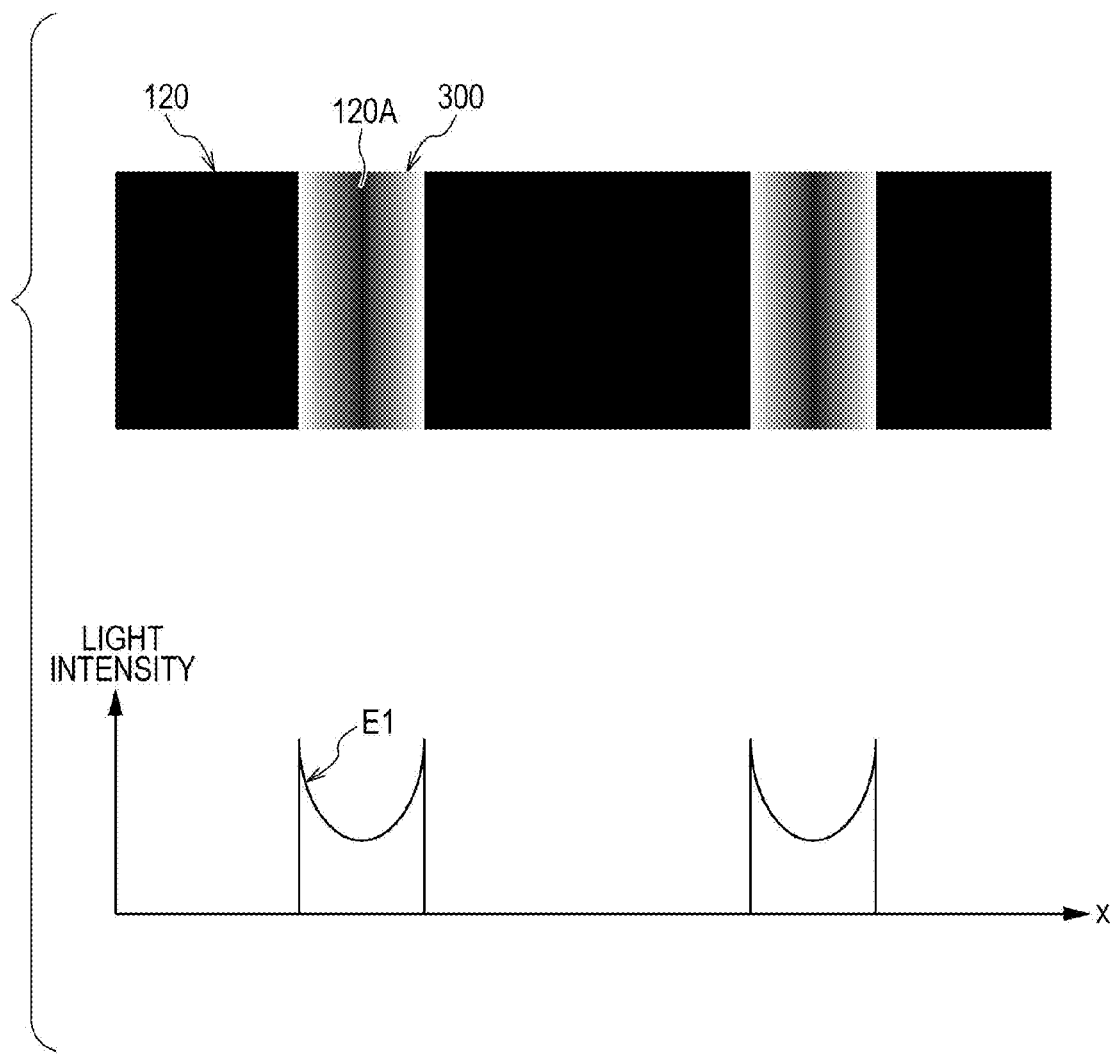
FIG. 10 is a diagram illustrating an example of a filter installed to the display apparatus according to the first embodiment of the disclosure.

In FIG. 10, a film 300 can be attached so as to cover the transmissive sections 120A. In this embodiment, the parallax barrier 120 and the film 300 can be attached to each other by an adhesive or the like so as to be integrated, but the embodiment of the disclosure is not limited thereto. For example, the parallax barrier 120 and the film 300 may be separated from each other. In each case, the parallax barrier 120 and the film 300 are close or adhered to each other so that light passing through the transmissive sections 120A necessarily passes through the film 300 to be emitted.

The filter 300 is designed to have a transmittance distribution in which the transmittance of the light passing through the central portion of the transmissive section 120A is lower than the transmittance of the light passing through the circumferential portion of the transmissive section 120A. Thus, when the light passes through the filter 300, it is possible to execute control so that the amount of light that does not pass through the central portion of the transmissive portion 120A is larger than the amount of light that does not pass through the circumferential portion of the transmissive section 120A.

Figure 11:
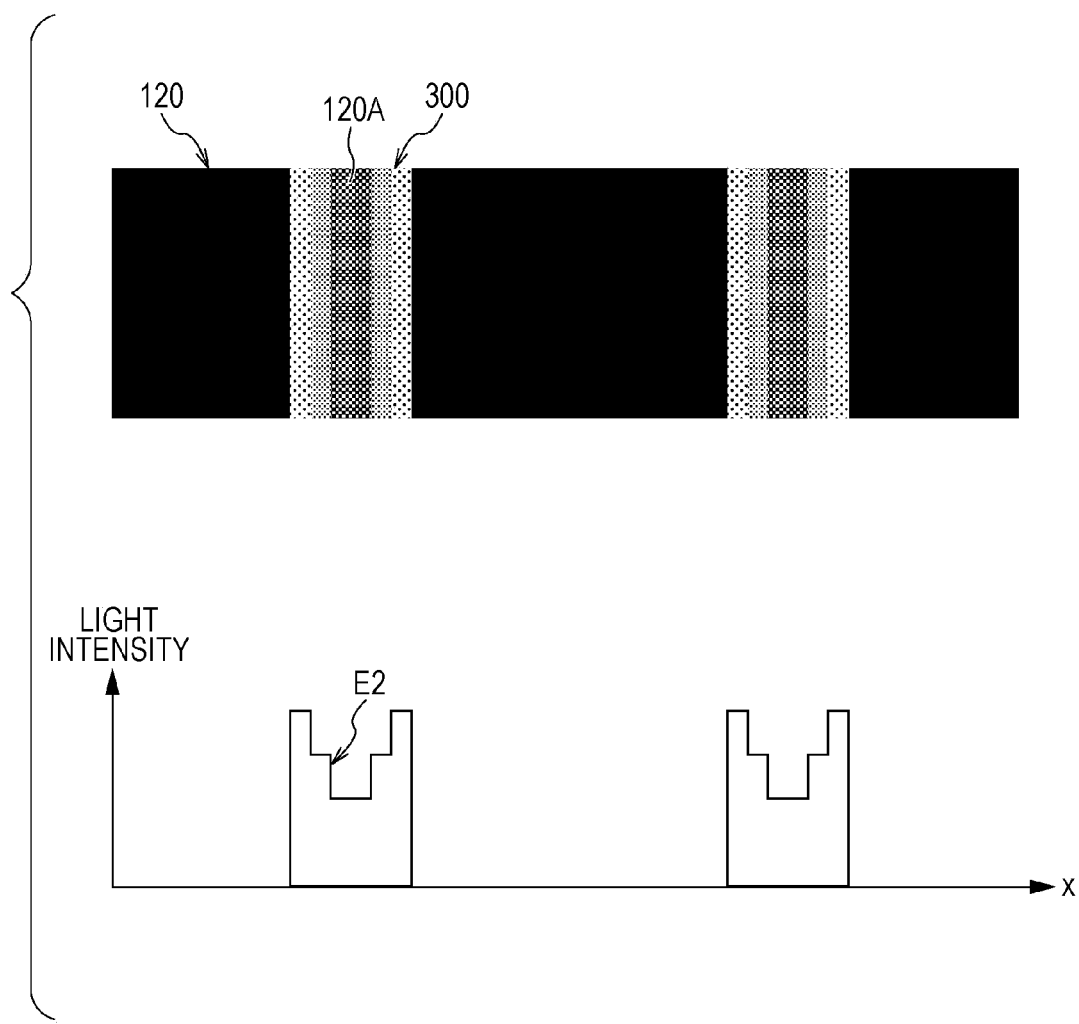
FIG. 11 is a diagram illustrating another example of the filter installed to the display apparatus according to the first embodiment of the disclosure.

The filter 300 is designed so that the light of the frequency components equal to or less than N order in the light passing through the transmissive section 120A is eliminated in the transmittance distribution. Specifically, the filter 300 is designed so that the transmittance distribution thereof is lowered in a curved shape E1 from the circumferential portion of the transmissive section 120A to the central portion thereof. As shown in FIG. 11, the filter 300 may be designed so that the transmittance distribution of the filter 300 is lowered in a step shape E2 from the circumferential portion of the transmissive section 120A to the central portion of the transmissive section 120A. In accordance with the transmittance distribution designed in this way, the light of the low-order passing through the central portion of the transmissive section 120A is mainly eliminated by the filter 300 and the light of the high-order passing through the circumferential portion of the transmissive section 120A is mainly eliminated by the filter 300.

For example, when four viewpoint images are displayed on the display surface of the display 110, the filter 300 has the transmittance distribution in which the light of the low-order including the at least four-order frequency component is eliminated in the light passing through the transmissive section 120A. Thus, it is possible to eliminate the light with the four-order frequency component which mainly passes through the central portion of the transmissive section 120A and in which the moire shown in the lower part of FIG. 8 is most strongly exhibited by the use of the filter 300. In this way, by cutting the light with the low-order frequency component, which is a cause of generation of the moire, by the use of the filter 300, it is possible to reduce the generation of the moire.

When a filter is provided in the pixel opening section 110A of the display 110, the filter is likewise designed so as to have a transmittance distribution in which the transmittance of the light passing through the central portion of the pixel opening section 110A is lower than the transmittance of the light passing through the circumference portion of the pixel opening section 110A.

In particular, in a case of the self-luminous type display 110 such as an organic EL, a filter (not shown) may be used which has a transmittance distribution in which the luminescence intensity of the light passing through the central portion of the pixel opening section 110A of the display 110 is lower than the luminescence intensity of the light passing through the circumferential portion of the pixel opening section 110A of the display 110.

The filter is designed so as to eliminate the light of the frequency component at least equal to or less than a three-order frequency component in the light passing through the central portion of the pixel opening section 110A of the display 110 in accordance with the transmittance distribution. For example, when one pixel is formed by three sub-pixels in the display 110, the filter has the transmittance distribution in which the light of the frequency component at least equal to or less than the three-order frequency component is eliminated in the light passing through the pixel opening section 110A of the display 110. Thus, it is possible to eliminate the light of the low-order which passes through the central portion of the pixel opening section 110A of the display 110 and includes the three-order frequency component in which the moire shown in the upper part of FIG. 8 is most strongly exhibited. In this way, by cutting the light with the low-order frequency component, which is a cause of generation of the moire, it is possible to reduce the generation of the moire.

The filter may be designed so that the transmittance distribution of the filter attached to the pixel opening section 110A of the display 110 is lowered in a curved shape from the circumferential portion of the pixel opening section 110A to the central portion of the display 110 (see FIG. 10). Further, the filter may be designed so that the transmittance distribution of the filter is lowered in a step shape from the circumferential portion of the pixel opening section 110A to the central portion of the pixel opening section 110A of the display 110 (see FIG. 11).

2. Second Embodiment

Next, a second embodiment of the disclosure will be described with reference to FIGS. 12 to 16. The second embodiment of the disclosure is different from the first embodiment in the configuration of the parallax barrier 120. However, since the remaining configuration is the same as that of the first embodiment, the detailed description thereof will not be repeated.

2-1. Configuration of Display Apparatus

Figure 12:
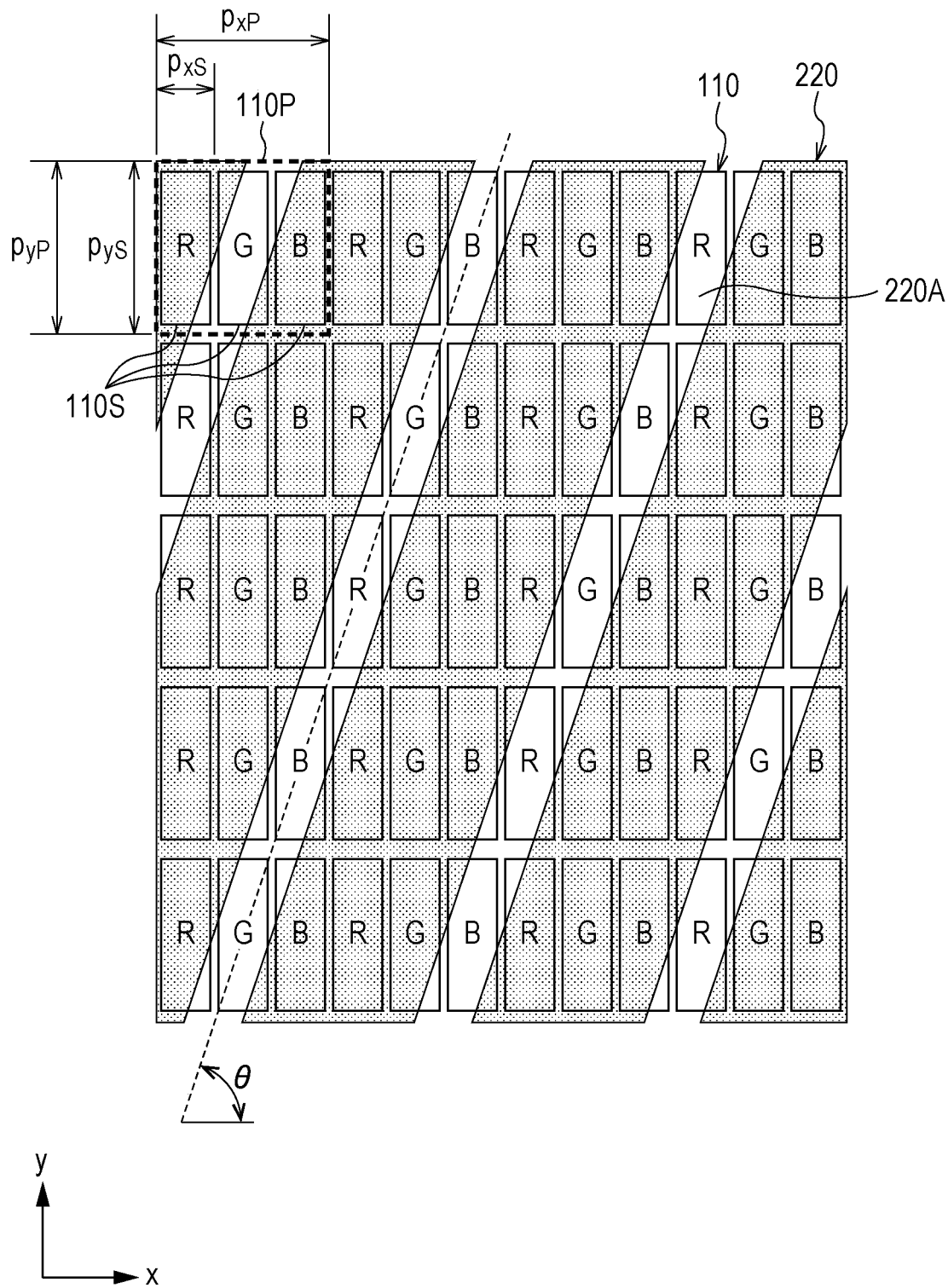
FIG. 12 is a schematic elevational view illustrating the display and the parallax barrier according to a second embodiment of the disclosure, when viewed from the side of the viewpoint.

FIG. 12 is a schematic elevational view illustrating the display 110 and the parallax barrier 220 according to the second embodiment of the disclosure, when viewed from the side of the viewpoint. In the display 110, as shown in FIG. 12, sub-pixels 110S are periodically arranged. In this embodiment, a pixel 110P is formed by three sub-pixels 110S. The number of sub-pixels of the pixel may be plural and the embodiment of the disclosure is not limited to 3. In a parallax barrier 220, transmissive sections 220A are periodically arranged. In this embodiment, the number of viewpoints N is 4.

The transmissive sections 220A are periodically arranged in the parallax barrier 220 and have a stripe shape. In the second embodiment, the parallax barrier 220 is a kind of barrier called a stripe barrier, in which the transmissive sections 220A are arranged in the inclination direction of an angle θ. The barrier pitch of the transmissive section 220A will be described below.

Figure 13:
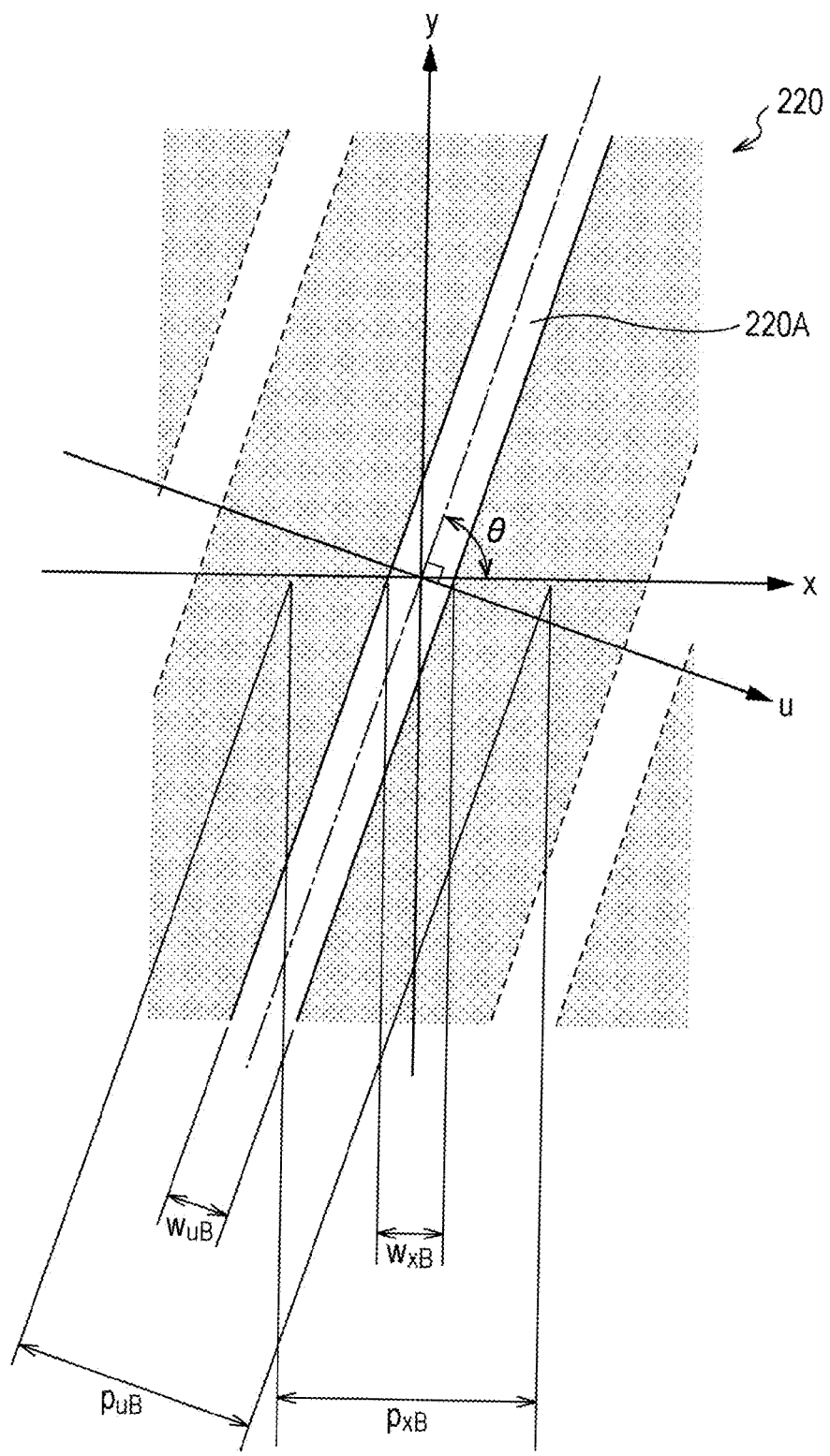
FIG. 13 is a diagram illustrating a barrier opening width according to the second embodiment of the disclosure.

FIG. 13 is a diagram illustrating the transmissive section 220A according to the second embodiment of the disclosure. As shown in FIG. 13, the transmissive sections 220A are periodically arranged in the parallax barrier 220.

The transmissive section 220A has a stripe shape extending in the inclination direction of the angle θ with respect to the x axis. Here, a u axis is set in a direction perpendicular to the extension direction of the transmissive section 220A. The relationships between a distance u in the u-axis direction and the x and y axes are expressed by Expression (18).

$$x = u \cos \theta$$

$$y = u \sin \theta \quad (18)$$

The transmissive section 220A has a width $w_{uB}$ in the u-axis direction. Further, the transmissive sections 220A are arranged at a barrier pitch $p_{uB}$ in the u-axis direction. Hereinafter, the light intensity distribution in the u-axis direction in the parallax barrier 220 will be described. In the transmissive section 220A, a width $w_{xB}$ in the x-axis direction and the barrier pitch $p_{xB}$ in the x-axis direction may be defined as in Expression (19).

$$w_{xB} = w_{uB} \cos \theta$$

$$p_{xB} = p_{uB} \cos \theta \quad (19)$$

Although not illustrated, a width $w_{yB}$ in the y-axis direction and a barrier pitch $p_{yB}$ in the y-axis direction can also be defined, as in Expression (20).

$$w_{yB} = x_{uB} \sin \theta$$

$$P_{yB} = P_{uB} \sin \theta \quad (20)$$

2-2. Light Intensity Distribution in Image

As in the light intensity distribution of the parallax barrier 120 described with reference to FIG. 6 in the first embodiment, the light intensity distribution of the parallax barrier 220 has a pulse-shaped periodic structure with a period $p_{uB}$ and a width $w_{uB}$ in the u-axis direction. The light intensity observed with periodic structure is expressed as a function $f_B(u)$ for the distance u in the u-axis direction using a Fourier series, as in Expression (21). In this expression, m denotes the series order and $b_m$ denotes a Fourier coefficient.

$$f_B(u) = \sum_{m=-\infty}^{\infty} b_m \cdot \exp\left[-i2\pi \frac{m}{p_{uB}} u\right] \quad (21)$$

The light intensity observed in an image displayed by the display apparatus 100 according to the second embodiment of the disclosure is a light intensity that is formed by superimposing the light intensity in the display 110 on the light intensity in the parallax barrier 220. The light intensity formed by the superimposing is expressed by a product of the functions representing the respective light intensities. Accordingly, the light intensity distribution observed in the image is expressed by a product of the function $f_P(x,y)$ of Expression (6) representing the light intensity in the display 110 of the first embodiment and the function $f_B(u)$ of Expression (21) representing the light intensity in the parallax barrier 220, as in Expression (22).

$$f_P(x,y) \cdot f_B(u) = \sum_{m=-\infty}^{\infty} \sum_{n=-\infty}^{\infty} a_{mn} \cdot \exp\left[-i2\pi\left(\frac{m}{p_{xP}}x + \frac{n}{p_{yP}}y\right)\right] \cdot$$
$$\sum_{m=-\infty}^{\infty} b_m \cdot \exp\left[-i2\pi \frac{m}{p_{uB}}u\right]$$
$$= \sum_{m=-\infty}^{\infty} a_m \cdot \exp\left[-i2\pi \frac{m}{p_{xP}}x\right] \cdot$$
$$\sum_{n=-\infty}^{\infty} a_n \cdot \exp\left[-i2\pi \frac{n}{p_{yP}}y\right] \cdot$$
$$\sum_{m=-\infty}^{\infty} b_m \cdot \exp\left[-i2\pi \frac{m}{p_{uB}}u\right] \quad (22)$$

The envelope line of the discrete spectrum of a function having a pulse-shaped periodic structure has a sinc function. Therefore, when the envelope line of the discrete spectrum is applied to the function $f_B(u)$ of Expression (21) representing the light intensity of the parallax barrier 220, a Fourier coefficient of the form of the sinc function is calculated as in Expression (23).

$$b_m = \frac{\sin\left(\frac{w_{uB}}{p_{uB}} m\pi\right)}{m\pi} \quad (23)$$

2-3. Cause of Generation of Moire

Here, the light intensity distribution of the parallax barrier 220 has a discrete spectrum of an interval of $1/P_{uB}$ in the u-axis direction. The light intensity distribution is decomposed in the x-axis and y-axis directions in the consideration of the superimposition with the light intensity distribution of the display 110. The light intensity distribution of the parallax barrier 220 in the x-axis direction has a discrete spectrum with an interval of $1/p_{uB} \cos \theta$ from Expression (19).

As described with reference to FIG. 8 in the first embodiment, there is a high possibility of the moire being generated in the frequency component commonly contained in the light intensity distributions of the display 110 and the parallax barrier 220. This condition is expressed for the x-axis direction by Expression (24) by the use of Expression (3).

$$\frac{N}{p_{uB}\cos\theta} = \frac{3}{p_{xP}} \quad (24)$$

This condition is expressed for the y-axis direction by Expression (25) by the use of Expression (4).

$$\frac{N}{p_{uB}\sin\theta} = \frac{1}{p_{yP}} \quad (25)$$

In this expression, on the assumption that $p_{xS}$ is the first sub-pixel pitch in the x-axis direction and $p_{yS}$ is the second sub-pixel pitch in the y-axis direction, the sub-pixel pitch $p_{uS}$ in the u-axis direction is defined as in Expression (26).

$$p_{uS} = \frac{p_{xS}}{\cos\theta} = \frac{p_{yS}}{\sin\theta} \quad (26)$$

When Expression (24) and Expression (25) are summarized in the u-axis direction using Expression (26), the condition that the moire is generated in the observed image is expressed by Expression (27) on the assumption that s is any integer.

$$s\frac{N}{p_{uB}} = s\frac{1}{p_{uS}} \quad (27)$$

In this embodiment, N is 4 in Expression (24), Expression (25), and Expression (27), as described above.

FIG. 14 is a diagram illustrating a combination of the frequencies of the light intensities in the x-axis direction, which is the first direction, and y-axis direction, which is the second direction, according to, the second embodiment of the disclosure. As shown in FIG. 14, the combination of the space frequencies of the light intensity distribution of the display 110 and the light intensity distribution of the parallax barrier 220 in the x-axis and y-axis directions is plotted.

The frequency distribution shown here is a frequency distribution formed by combining the frequency distributions described with reference to FIG. 8 in the first embodiment in the x-axis and y-axis directions from Expression (24), Expression (25), and Expression (27). Accordingly, the combination of the frequency components commonly contained in the light intensity distribution of the display 110 and the light intensity distribution of the parallax barrier 220 in the x-axis and y-axis directions is shown as a combination of the frequency components in which the beat occurs. Here, the frequency at which the beat (moire) occurs appears at an equal interval in the xy space due to the periodicity of the light intensity distribution of the display 110 and the periodicity of the light intensity distribution of the parallax barrier 220.

2-4. Design for Reducing Moire

As expressed in Expression (22), the light intensity observed in the image is expressed by the product of the light intensity of the display 110 and the light intensity of the parallax barrier 220. Accordingly, when one of the light intensities approaches 0 in the combination of the frequency components at which the moire is generated, it is possible to reduce the moire.

First, when the Fourier coefficient expressed by Expression (23) becomes 0 in the light intensity distribution of the parallax barrier 220, the light intensity (amplitude) of the frequency at which the moire is generated can be made to approach 0, thereby preventing the moire from being generated. The condition that the Fourier coefficient becomes 0 is expressed by Expression (28), when j is any integer.

$$\frac{\sin\left(\frac{w_{uB}}{p_{uB}}j\pi\right)}{j\pi} = 0 \quad (28)$$

The above condition is expressed by Expression (29) for the u-axis direction. In this expression, the width $w_{uB}$ is not greater than the barrier pitch $p_{uB}$; j is 1, 2, . . . , N. That is, j is a natural number equal to or less than the number of viewpoints N.

$$\frac{p_{uB}}{p_{uS}} = j \quad (29)$$

When the condition expressed by Expression (15) for the display 110 and Expression (29) for the parallax barrier 220 is summarized, one of the following conditions may be satisfied in order to reduce the moire observed in the image displayed by the display apparatus 100.

(a) A ratio of the width $w_{uB}$ to the sub-pixel pitch $P_{uS}$ is a natural number equal to or less than N.

(b) The first pixel opening width $w_{xP}$ is identical to the first sub-pixel pitch $p_{xS}$.

(c) The second pixel opening width $w_{yP}$ is identical to the second sub-pixel pitch $p_{yS}$.

In the actual design of the display apparatus 100, it is difficult to precisely satisfy the above-mentioned conditions since there is a necessity to form a space for a driving circuit between the sub-pixels 110S. However, by designing the display apparatus so as to approximate the above-mentioned conditions, the moire can be reduced to some extent. In this case, by designing the display apparatus so as to satisfy a number of the conditions (a) to (c), the product of three Fourier coefficients shown in Expression (22) has a smaller value, thereby further reducing the moire.

3. Embodiments of Filter

The filter 300 described in the first embodiment is applicable to the display 110 or the parallax barrier 120 of the display apparatus 100 according to the first and second embodiments. Further, the filter can be attached to an image display unit or a barrier unit of a general display apparatus.

Figure 15A:
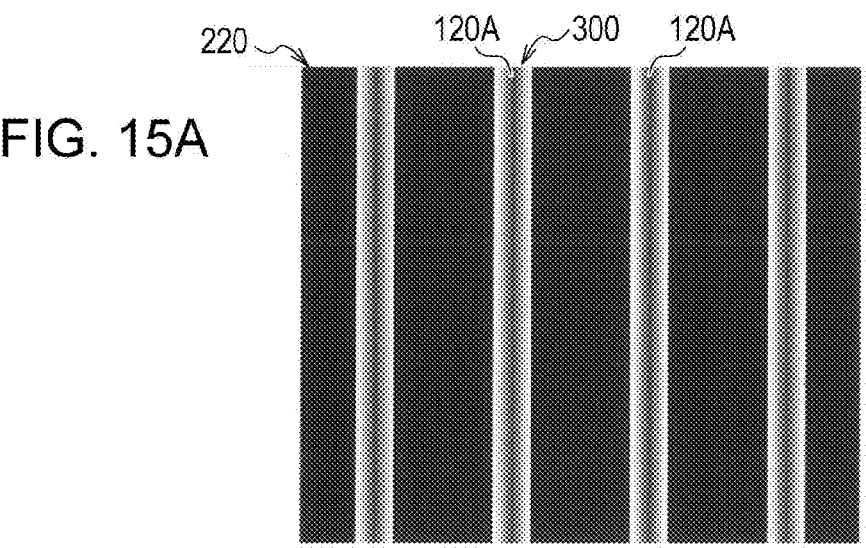
FIG. 15A is a diagram illustrating a filter according to an embodiment.
Figure 15B:
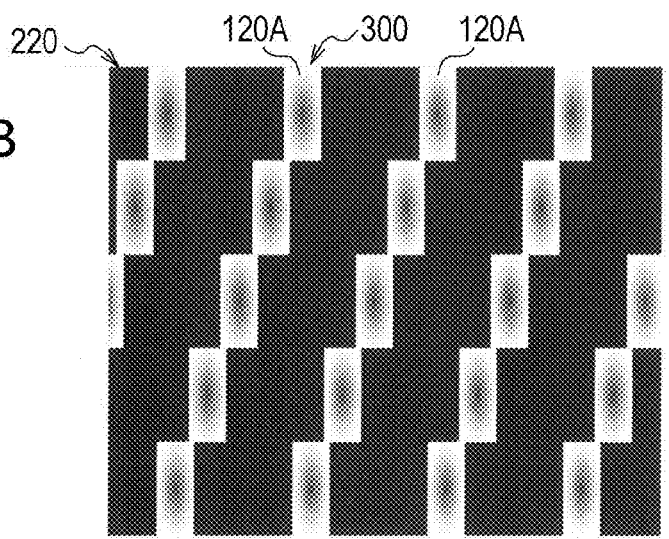
FIG. 15B is a diagram illustrating a filter according to an embodiment.

For example, in FIG. 15A, the filter 300 can be attached to the vertically long transmissive sections 120A periodically arranged in the parallax barrier 220. In FIG. 15B, the filter 300 can be attached to the transmissive sections 120A having a step shape in an inclination direction.

Figure 15C:
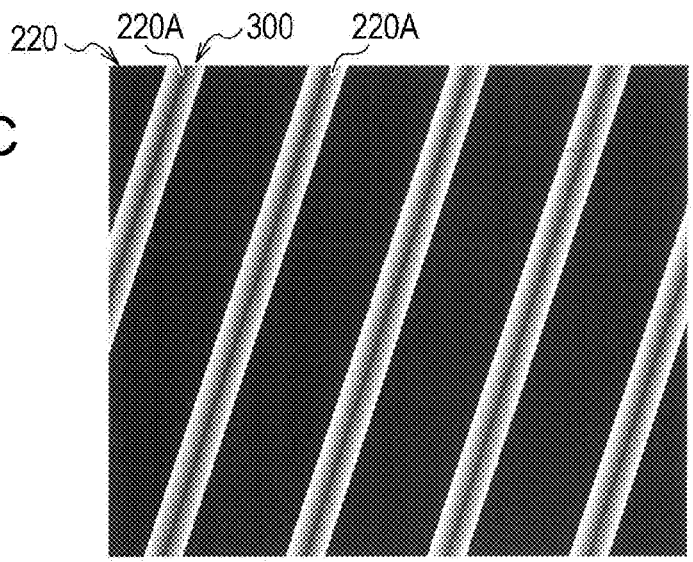
FIG. 15C is a diagram illustrating a filter according to an embodiment.
Figure 16:
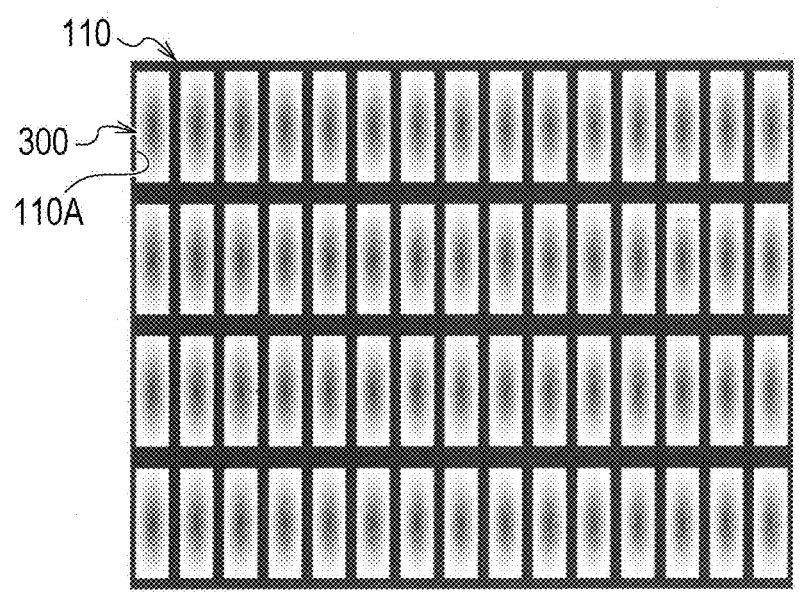
FIG. 16 is a diagram illustrating a filter according to an embodiment.

In FIG. 15C, the filter 300 can be attached to the transmissive sections 220A periodically arranged in the inclination direction in the parallax barrier 220. In FIG. 16, the filter 300 can be attached to the pixel opening section 110A, which is a transmissive section of light in a pixel for one of three colors of R, G, and B, in the display 110.

The preferred embodiments of the disclosure have hitherto been described with reference to the accompanying drawings, but the disclosure is not limited to the embodiments. It should be apparent to those skilled in the art that various modifications and alterations may occur within the scope of the appended claims or the equivalents thereof and it should be understood that the modifications and alterations, of course, pertain to the technical scope of the disclosure.

For example, the filter has hitherto been used in the above-described embodiments. However, other members may be used as long as the amount of light can be controlled so that the transmittance of the light passing through the central portion of the transmissive section of the barrier unit is lower than the transmittance of the light passing through the circumferential portion of the transmissive section of the barrier unit in order to eliminate the light with the low-order frequency component.

The barrier unit according to the embodiments of the disclosure may be configured by a liquid crystal panel. In this case, since the transmittance can be varied by a voltage applied to the liquid crystal panel, it is not necessary to use a special filter. Accordingly, in this case, the barrier unit has a transmittance distribution in which the transmittance of the light passing through the central portion of the transmissive section of the barrier unit is lower than the transmittance of the light passing through the circumference portion of the transmissive section of the barrier unit. With such a configuration, by cutting the light with the low-order frequency component which passes through the central portion of the transmissive section of the barrier unit without using a filter and is a cause of generation of the moire, it is possible to suppress the generation of the moire.

The case has hitherto been described in which one pixel is formed by three sub-pixels of R, G, and B in the above-described embodiments, but the disclosure is not limited thereto. For example, the filter 300 may be attached to the pixel opening section 110A, which is a transmissive section of light in a pixel for one of four colors of R, G, B, and Y, in the display 110.

The present disclosure contains subject matter related to that disclosed in Japanese Priority Patent Application JP 2010-196818 filed in the Japan Patent Office on Sep. 2, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
    a display unit;
    a barrier unit including a plurality of transmissive sections; and
    a filter in at least one transmissive section of the barrier unit, the filter having a transmittance distribution in which transmittance of light passing through a central portion of the transmissive section of the barrier unit is lower than transmittance of light passing through a circumferential portion of the transmissive section of the barrier unit, wherein the display unit is configured to display N viewpoint images on a display surface, and wherein the filter is configured to eliminate light with a frequency component less than or equal to an N-order frequency component in the light passing through the transmissive section of the barrier unit in accordance with the transmittance distribution.

2. The display apparatus according to claim 1, wherein the filter is designed so that in the transmittance distribution, the transmittance is lowered in a curved shape from the circumferential portion of the transmissive section of the barrier unit to the central portion of the transmissive section of the barrier unit.

3. The display apparatus according to claim 1, wherein the filter is designed so that in the transmittance distribution, the transmittance is lowered in a step shape from the circumferential portion of the transmissive section of the barrier unit to the central portion of the transmissive section of the barrier unit.

4. The display apparatus according to claim 1,
    wherein in the display unit, sub-pixels are periodically arranged at a first sub-pixel pitch in a first direction of a screen, each pixel is formed by the plurality of sub-pixels, and a plurality of viewpoint images is displayed on a display surface,
    wherein the barrier unit is disposed in front of the display surface of the display unit, and the transmissive sections having a first width in the first direction in the barrier unit are periodically arranged so that the plurality of viewpoint images are separated, and
    wherein the first width is set to be close to a multiple m (where m=1, 2, . . . , N) of the first sub-pixel pitch.

5. The display apparatus according to claim 4, wherein the first width is a multiple m of the first sub-pixel pitch.

6. A display apparatus comprising:
    a display unit;
    a barrier unit including a plurality of transmissive sections; and
    a filter having a transmittance distribution in which transmittance of light passing through a central portion of an opening section of the display unit is lower than transmittance of light passing through a circumferential portion of the opening section of the display unit, wherein the display unit is configured to display N viewpoint images on a display surface, and wherein the filter is configured to eliminate light with a frequency component less than or equal to an N-order frequency component in the light passing through the opening section of the display unit in accordance with the transmittance distribution.

7. The display apparatus according to claim 6, wherein the filter is designed so that in the transmittance distribution, the transmittance is lowered in a curved shape from the circumferential portion of the opening section of the display unit to the central portion of the opening section of the display unit.

8. The display apparatus according to claim 6, wherein the filter is designed so that in the transmittance distribution, the transmittance is lowered in a step shape from the circumferential portion of the opening section of the display unit to the central portion of the opening section of the display unit.

9. A display apparatus comprising:
    a display unit displaying an image in a self-luminescent manner;
    a barrier unit disposed on a side of a display surface of the display unit and configured to separate an image displayed on the display unit; and a filter having a transmittance distribution in which luminescence intensity of light passing through a central portion of an opening section of the display unit is lower than luminescence intensity of light passing through a circumferential portion of the opening section of the display unit, wherein in the display unit, one pixel is formed by three sub-pixels, and wherein the filter is configured to eliminate light with a frequency component less than or equal to a three-order frequency component in the light passing through the opening section of the display unit in accordance with the transmittance distribution.

10. A display apparatus comprising:
a display unit; and
a barrier unit including a plurality of transmissive sections,
wherein the barrier unit has a transmittance distribution in which transmittance of light passing through central portions of the plurality of transmissive sections of the barrier unit is lower than transmittance of light passing through circumferential portions of the plurality of transmissive sections of the barrier unit, wherein the display unit is configured to display N viewpoint images on a display surface, and wherein the barrier unit is configured to eliminate light with a frequency component less than or equal to an N-order frequency component in the light passing through the transmissive sections of the barrier unit in accordance with the transmittance distribution.

11. The display apparatus according to claim 10, wherein the barrier unit is configured by a liquid crystal panel.

12. A display apparatus comprising:
a display unit; and
a barrier unit including a plurality of transmissive sections,
wherein transmittance of light in a central portion of a transmissive section is lower than transmittance of light in a circumferential portion of the transmissive section, wherein the display unit is configured to display N viewpoint images on a display surface, and wherein the barrier unit is configured to eliminate light with a frequency component less than or equal to an N-order frequency component in the light passing through the transmissive section of the barrier unit.

* * * * *